US012683140B2

(12) United States Patent
Rempt et al.

(10) Patent No.: US 12,683,140 B2
(45) Date of Patent: Jul. 14, 2026

(54) TARGET FOR USE IN A LASER DESORPTION MASS SPECTROMETER

(71) Applicant: Roche Diagnostics Operations, Inc., Indianapolis, IN (US)

(72) Inventors: Martin Rempt, Penzberg (DE); Manuel Josef Seitz, Berg (DE); Christoph Zuth, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 290 days.

(21) Appl. No.: 18/410,961

(22) Filed: Jan. 11, 2024

(65) Prior Publication Data

US 2024/0145227 A1 May 2, 2024

Related U.S. Application Data

(63) Continuation of application No. PCT/EP2022/069395, filed on Jul. 12, 2022.

(30) Foreign Application Priority Data

Jul. 13, 2021 (EP) .................................... 21185367

(51) Int. Cl.
*H01J 49/16* (2006.01)
*G01N 27/623* (2021.01)
(52) U.S. Cl.
CPC .......... *H01J 49/164* (2013.01); *G01N 27/623* (2021.01)
(58) Field of Classification Search
CPC ... H01J 49/164; H01J 49/0418; G01N 27/623
See application file for complete search history.

(56) References Cited

U.S. PATENT DOCUMENTS

2002/0187312 A1   12/2002   Fonash et al.
2006/0121473 A1    6/2006   Tanga et al.
2014/0120350 A1    5/2014   Kitsu et al.

FOREIGN PATENT DOCUMENTS

CN    101846650 A    9/2010
JP    2001242116 A   9/2001
JP    2002543440 A   12/2002
JP    2004138596 A   5/2004
JP    2007514274 A   5/2007
JP    2008170326 A   7/2008
JP    2012504766 A   2/2012

(Continued)

OTHER PUBLICATIONS

International Search Report; European Patent Office; International Application No. PCT/EP2022/069395; Oct. 27, 2022; 4 pages.

(Continued)

*Primary Examiner* — Wyatt A Stoffa
*Assistant Examiner* — Laura Eloise Tandy
(74) *Attorney, Agent, or Firm* — Taft Stettinius & Hollister LLP

(57) ABSTRACT

A target (110) for use in a laser desorption mass spectrometer is disclosed. The target (110) has at least one surface (112). wherein the surface (112) is covered at least partially with at least one layer (114), wherein the layer (114) is a hydrogen comprising, silicon-incorporated amorphous carbon (a-C:H:Si) layer (116), wherein the a-C:H:Si layer (116) comprises:
    40 at. % to 80 at. % of carbon;
    1 at. % to 20 at. % of hydrogen; and
    10 at. % to 40 at. % of silicon.

19 Claims, 23 Drawing Sheets

(56) References Cited

FOREIGN PATENT DOCUMENTS

| JP | 2020131652 A | 8/2020 |
|---|---|---|
| WO | 2000067293 A1 | 11/2000 |
| WO | 2005045419 A2 | 5/2005 |
| WO | 2005096346 A3 | 10/2005 |
| WO | 2005104180 A2 | 11/2005 |
| WO | 2007097023 A1 | 8/2007 |
| WO | 2010042370 A1 | 4/2010 |
| WO | 2012169540 A1 | 12/2012 |

OTHER PUBLICATIONS

Written Opinion of the International Searching Authority; European Patent Office; International Application No. PCT/EP2022/069395; Oct. 27, 2022; 6 pages.

Law et al., Recent advances in SALDI-MS techniques and their chemical and bioanalytical applications, Analytical and Bioanalytical Chemistry, Aug. 21, 2010, pp. 2597-2622, vol. 399.

Kosyakov et al., Carbon Nanocoatings: A New Approach to Recording Mass Spectra of Low-Molecular Compounds Using Surface-Assisted Laser Desorption/Ionization Mass Spectrometry, Journal of Analytical Chemistry, Apr. 16, 2015, pp. 1221-1227, vol. 71, No. 13.

Najam-Ul-Haq et al., Nanostructured Diamond-Like Carbon on Digital Versatile Disc as a Matrix-Free Target for Laser Desorption/Ionization Mass Spectrometry, Analytical Chemistry, Oct. 1, 2008, pp. 7467-7472, vol. 80, No. 19.

Etxebarria et al., Nanostructured weathering steel for matrix-free laser desorption ionisation mass spectrometry and imaging of metabolites, drugs and complex glycans, Journal of The Society of Chemistry, Mar. 11, 2014, pp. 2873-2883, vol. 139.

Han et al., An Activated Carbon Substrate Surface for Laser Desorption Mass Spectrometry, Journal of American Society for Mass Spectrometry, Mar. 20, 2000, pp. 644-649, vol. 11, No. 7.

International Preliminary Report on Patentability; European Patent Office; International Application No. PCT/EP2022/069395; Jan. 25, 2024; 7 pages.

Reichardt et al., "Nanostructured weathering steel for matrix-free laser desorption ionisation mass spectrometry and imaging of metabolites, drugs and complex glycans," Analyst, 2014, vol. 139, pp. 2873-2883.

Decision to Grant a Patent; Japanese Patent Office; Japanese Application No. 2024-501694; Apr. 2, 2026; 5 pages.

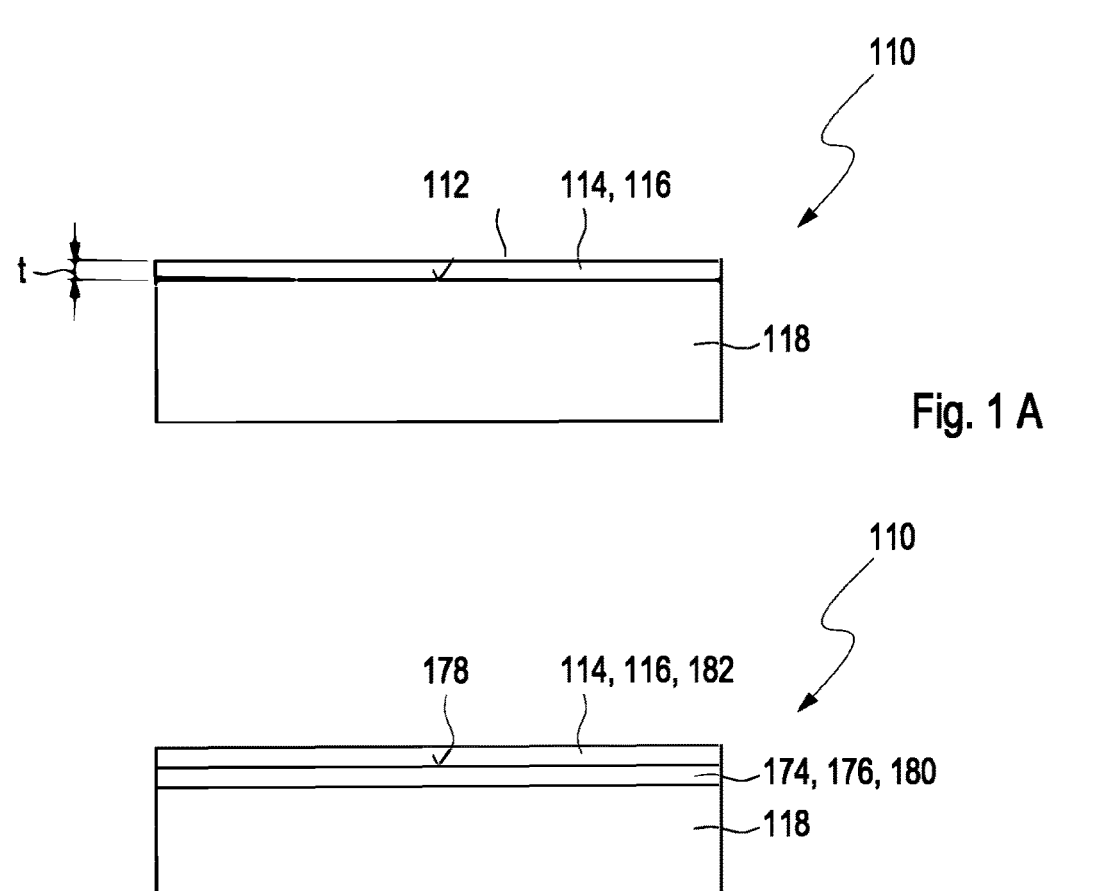
Fig. 1 A
Fig. 1 B
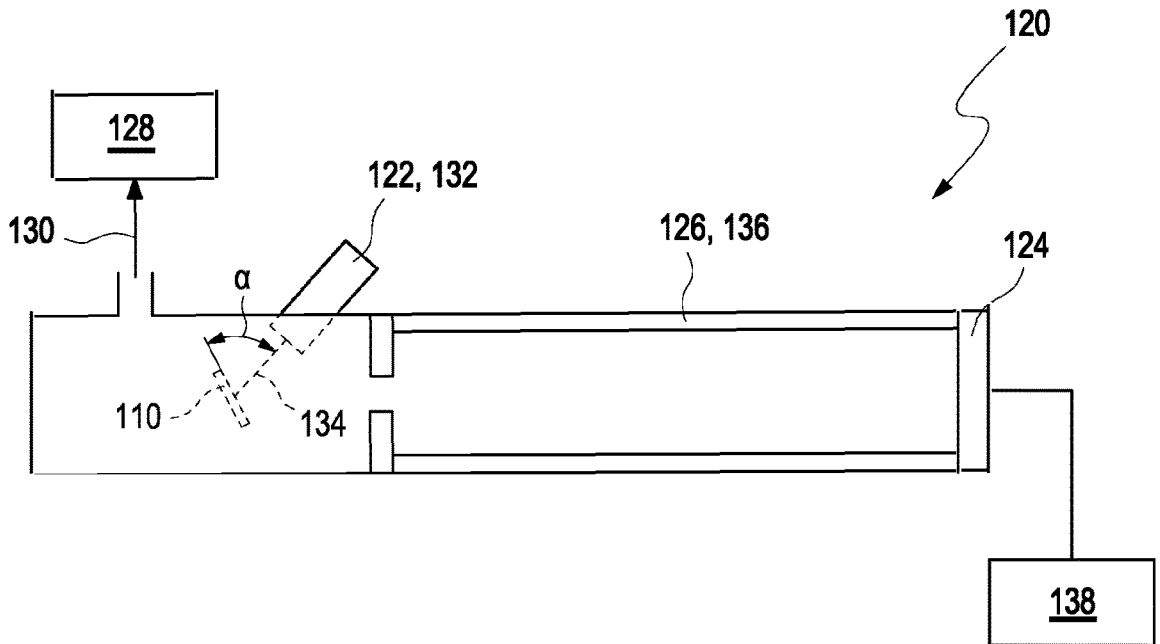
Fig. 2

TARGET FOR USE IN A LASER DESORPTION MASS SPECTROMETER

CROSS-REFERENCE TO RELATED APPLICATIONS

This application is a continuation of International PCT Application No. PCT/EP2022/069395 filed on Jul. 12, 2022, which claims priority to European Patent Application No. 21185367.6 filed on Jul. 13, 2021, the contents of each application are incorporated herein by reference in their entireties.

TECHNICAL FIELD

The invention relates to a target for use in a laser desorption mass spectrometer, a use of a target, a laser desorption mass spectrometer, a continuous laser desorption mass spectrometer system, a method for preparing at least one sample for analysis in a laser desorption mass spectrometer and a method for detecting at least one analyte in a sample with a laser desorption mass spectrometer. The devices and methods may be applied for measuring a mass of an analyte or a mass of fragments of the analyte for the purpose of identifying the analyte, as well as the quantitative determination of the analyte. Specifically, the devices and methods may be applied for the quantitative analysis of biological molecules such as proteins, peptides, oligonucleotides and small molecular compounds. Other applications, however, are also feasible.

BACKGROUND ART

In mass spectrometry, matrix-assisted laser desorption/ionization (MALDI) is an ionization technique that uses a laser energy absorbing matrix to create ions from large molecules with minimal fragmentation. It is commonly applied for an analysis of biomolecules and various organic molecules, which tend to be fragile and fragment when ionized by more conventional ionization methods. The MALDI methodology is commonly a three-step process. Firstly, a sample is mixed with a suitable matrix material and is applied to a metal plate. Secondly, a pulsed laser irradiates the sample, triggering ablation and desorption of the sample and matrix material. Finally, analyte molecules are ionized by being protonated or deprotonated in a hot plume of ablated gases. Subsequently, they can be accelerated into a mass spectrometer for analysis.

A variation of this technology is the surface assisted laser desorption ionization (SALDI) process. The surface assisted laser desorption ionization is a soft laser desorption technique used for mass spectrometry analysis. In its first embodiment Koichi Tanaka used a cobalt/glycerol liquid matrix and subsequent applications included a graphite/glycerol liquid matrix as well as a solid surface of porous silicon. The porous silicon represents the first matrix-free SALDI surface analysis allowing for facile detection of intact molecular ions. Since then, a multitude of different surfaces have been reported to work as SALDI substrates with varying degrees of success. Based on the elemental composition, the majority of the SALDI substrates reported in the literature can commonly be classified into three main types: carbon-based, semiconductor-based and metallic-based.

The SALDI process using inorganic matrices for the preparations is described in several works. In Law et al., Anal. Bioanal. Chem. 2011, 399, 2597, DOI 10.1007/ s00216-010-4063-3, recent advances in SALDI-MS techniques and their chemical and bioanalytical applications are described. As based on Law et al. a matrix free device may fulfill the following conditions. Firstly, a laser desorption ionization performance should be much higher than a performance of a direct laser desorption. A sanded metal or silicon surface may serve as an experimental control. Secondly, a laser fluence required to achieve laser desorption ionization should be no more than a normal operation of MALDI using conventional organic matrices. Thirdly, being a soft ionization technique, molecular ions, or quasi-molecular ions of the analyte should dominate the mass spectra. Fourthly, if fragmentation occurs, a fragmentation pattern should be both, orderly and predictable. Fifthly, a wide range of classes of compounds should be analyzed by the technique.

General main problems of organic matrices are that the sample and the matrix components need to come together in liquid solution followed by drying and therefore co-crystallization. Resulting ion species of organic matrix assisted laser desorption are protonated species $[M+H]^+$. To the contrary, inorganic matrices mostly give metallized species e.g. $[M+Na]^+$ which is mostly driven by only a heat transfer from matrix to the analyte and therefore there is commonly no need for a co-crystallization.

Coatings comprising amorphous diamond-like carbon materials with application in SALDI mass spectrometry are described in several works, In Kosyakv et al., J. Anal. Chem. 2016, 71, 1221, DOI 10.1134/S1061934816130086, a simple and rapid approach to obtaining target plates for the investigation of low-molecular weight compounds by surface-assisted laser desorption/ionization (SALDI) mass spectrometry is proposed. It consists of the vacuum sputtering of a carbon layer with a thickness of about 50 nm onto a metal surface. The resulting coatings are characterized by homogeneity, hydrophobicity, and high mechanical strength, which eliminates a possibility of mass spectrometer contamination. A comparison of the SALDI mass spectra of test compounds recorded using conventional carbon materials and carbon nanocoatings demonstrates advantages of the last named materials, such as high spectral resolution and the absence of spectral interferences at low m/z values.

In Bonn et al., Anal. Chem. 2008, 80, 7467, DOI 10.1021/ac801190e, a nanostructured diamond-like carbon coated digital versatile disc is described for the use as a matrix-free target for laser desorption/ionization mass spectrometry. A large number of vacancies, defects, relative $sp^2$-carbon content, and nanogrooves of DLC films support the LDI phenomenon. The observed absorptivity of DLC is in the range of 305-330 nm (nitrogen laser, 337 nm). The universal applicability is demonstrated through different analytes like amino acids, carbohydrates, lipids, peptides, and other metabolites.

WO 2005/104180 A2 describes a use of composites or compositions of diamond/non-diamond material, e.g. diamond/non-diamond carbon material for chemical or biological analysis. Further, the use of this material in separation adherence and detection of chemical or biological samples is described. Applications of either structured substrates or mixed phase particles of this material include but are not limited to processes which involve desorption-ionization of a sample, more specifically mass spectroscopy.

WO 2005/096346 A3 describes a target for a laser desorption/ionization mass spectrometer, comprising a substrate that is at least partially coated with a carbon-containing layer comprising a material selected from the group consisting of diamond, amorphous carbon, DLC (diamond-like carbon), graphite, nanotubes, nanowires, fullerenes and mixtures thereof.

US 2002/0187312 A1 describes an apparatus for providing an ionized analyte for mass analysis by photon desorption comprising at least one layer for contacting an analyte, and a substrate on which said layer is deposited. Upon irradiation of said apparatus, said analyte desorbs and ionizes for analysis by mass spectrometry. The layer or layers of said apparatus comprise a continuous film, a discontinuous film or any combinations thereof.

In Reichardt et al., Analyst 2014, 139, 2873, DOI 10.1039/c4an00216d, nanostructured weathering steel for matrix-free laser desorption ionization mass spectrometry and imaging of metabolites, drugs and complex glycans is described. Specifically, weathering steel has been employed for the first time to prepare sample plates for matrix-free laser desorption ionization mass spectrometry (LDI-MS) of small molecules up to a mass range of around 1500 Da. The effective UV absorption, heat conductivity and porosity of the nanostructured inner rust layer formed during passivation determine the excellent performance in LDI-MS for a broad range of different analyte classes. The inexpensive material was evaluated in a series of relevant analytical applications ranging from the matrix-free detection of serum metabolites, lactose quantification, lipid analysis in milk to the glycoprofiling of antibodies and imaging mass spectrometry of brain tissue samples.

Despite the advantages achieved by the above-mentioned devices and methods, several technical challenges remain.

Surfaces which comprise microstructured metal/semiconductors and/or carbon-based structures commonly exhibit an inherent problem of being not very resistant against mechanical is stress. If the microstructures are broken, the SALDI effect is usually diminished. Therefore, a reuse of those structures after the analysis is commonly not very practicable. Further, a process for production of such surface modifications commonly involves high technical and personal interaction. A large-scale process for the production of disposables is commonly not very practicable.

The ionization process for constructing pseudo molecular ions during ionization commonly relies on a surrounding of impurities besides the analyte. If a large excess of e.g. $Na^+$ or $K^+$ is present, a formation of metallized species is usually highly possible during ionization. A clean surface is commonly required to enhance the $H^+$ (proton) adduct. This is generally necessary because the protonated species fragment in the mass spectrometric analysis much better (formation of analyte breakdown products) and can therefore serve as measurable form of the analyte for a multiple reaction monitoring (MRM) analysis. To clean a surface some mechanical stress is always applied which makes it advantageous to use a surface, which can stand mechanical stress.

Although previously developed surface coatings based on diamond like carbon (DLC) or different carbon allotropes have shown a certain energy transfer from the surface to the analytes, this process is commonly not efficient enough to result in small detection limits for the purpose to ensure a broader analyte scope and to facilitate quantitative analysis. A further development and modification of the surface is therefore necessary to fulfill the requirements of current analytical issues.

Problem to be Solved

It is therefore desirable to provide a target for use in a laser desorption mass spectrometer, a use of a target, a laser desorption mass spectrometer, a continuous laser desorption mass spectrometer system, a method for preparing at least one sample for analysis in a laser desorption mass spectrometer and a method for detecting at least one analyte in a sample with a laser desorption mass spectrometer which at least partially address the above-mentioned technical challenges. Specifically, a surface with good mechanical strength shall be provided, which exhibits a good SALDI ion species generation efficiency.

SUMMARY

This problem is addressed by a target for use in a laser desorption mass spectrometer, a use of a target, a laser desorption mass spectrometer, a continuous laser desorption mass spectrometer system, a method for preparing at least one sample for analysis in a laser desorption mass spectrometer and a method for detecting at least one analyte in a sample with a laser desorption mass spectrometer with the features of the independent claims. Advantageous embodiments which might be realized in an isolated fashion or in any arbitrary combinations are listed in the dependent claims as well as throughout the specification.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a target for use in a laser desorption mass spectrometer is disclosed. The target has at least one surface. The surface is covered at least partially with at least one layer. The layer is a hydrogen comprising, silicon-incorporated amorphous carbon (a-C:H: Si) layer. The a-C:H:Si layer comprises:

40 at. % to 80 at. % of carbon;

1 at. % to 20 at. % of hydrogen; and 10 at. % to 40 at. % of silicon.

A sum of carbon, hydrogen and silicon may be up to 100%, specifically 100%. However, the a-C:H:Si layer may also comprise additional elements. Thus, the sum of carbon, hydrogen and silicon may be less than 100%. Specifically, the sum of carbon, hydrogen and silicon may be at least 51%, specifically at least 55%, specifically at least 60%, specifically at least 65%, specifically at least 70%, specifically at least 75%, specifically at least 80%, specifically at least 85%, specifically at least 90%, specifically at least 95%, specifically at least 98%.

The a-C:H:Si layer may specifically be a hydrogen comprising, heteroatom modified, silicon-incorporated amorphous carbon (a-C:H:Si:X) layer. The heteroatom X may be selected from the group consisting of oxygen, nitrogen, fluorine, boron and the a-C:H:Si:X layer may further comprise:

up to 15 at. % of oxygen;

up to 10 at. % of nitrogen;

up to 10 at. % of boron; and up to 5 at. % of fluorine;

A sum of oxygen, nitrogen, fluorine and boron may be at least 1 at. %, specifically at least 1.5 at. %, specifically at least 2 at. %.

A sum of carbon, hydrogen, silicon, oxygen, nitrogen, fluorine and boron specifically may be 100 at. %. However, the a-C:H:Si:X layer may also comprise additional elements. Thus, the sum of carbon, hydrogen, silicon, oxygen, nitrogen, fluorine and boron specifically may be less than 100 at. %. Thus, the sum of carbon, hydrogen, silicon, oxygen, nitrogen, fluorine and boron may be at least 52 at. %, specifically at least 55 at. %, specifically at least 60 at. %, specifically at least 65 at. %, specifically at least 70 at. %, specifically at least 75 at. %, specifically at least 80 at. %, specifically at least 85 at. %, specifically at least 90 at. %, specifically at least 95 at. %, specifically at least 98 at. %. Also other heteroatoms may be feasible. The heteroatom may specifically be selected from the group consisting of: a metalloid, specifically germanium, specifically antimony, specifically selenium, specifically, tellurium; a post-transition metal, specifically aluminum; a transition metal, specifically titanium, specifically vanadium, specifically niobium, specifically tantalum, specifically chromium, specifically molybdenum, specifically tungsten, specifically iron, specifically cobalt, specifically copper, specifically silver; a nonmetal, specifically phosphorus, specifically sulfur, specifically chlorine, specifically bromine, specifically iodine.

The expression "at. %" may specifically refer to an indication of a percentage of atoms in a chemical substance. The percentage of atoms may be calculated by dividing a number of all atoms of a kind of element by a number of all atoms within the chemical substance. Thereafter, the result may be multiplied with 100.

The term "mass spectrometer" as used herein is a broad term and is to be given its ordinary and customary meaning to a person of ordinary skill in the art and is not to be limited to a special or customized meaning. The term specifically may refer, without limitation, to an arbitrary analytical device which is configured for determining or measuring a mass-to-charge ratio of ions. Measurement results may specifically be presented as a mass spectrum, e.g. a plot of intensity as a function of the mass-to-charge ratio.

The term "laser desorption mass spectrometer" as used herein is a broad term and is to be given its ordinary and customary meaning to a person of ordinary skill in the art and is not to be limited to a special or customized meaning. The term specifically may refer, without limitation, to an arbitrary mass spectrometer based on an ionization technique using a laser. Specifically, the term may refer to a mass spectrometer which uses a medium and a laser for desorbing and ionizing a sample or parts of a sample from the medium. Specifically, the medium may absorb energy from a laser and may then transfer the energy to the sample or parts thereof. The ionization technique may also be referred to as soft ionization technique. The laser desorption mass spectrometer may specifically be configured as a surface-assisted laser desorption/ionization (SALDI) technique. The SALDI technique may comprise at least three different stages. At a first stage, a sample may be applied on a target. At a second stage, laser pulses of a laser may be applied to the target and the target may absorb laser energy and transfer the laser energy to molecules of the sample. At a third stage, desorption and ionization may occur and a potential difference may accelerate produced ions into a mass analyzer. The laser desorption mass spectrometer may specifically comprise the at least one target, at least one laser and at least one mass analyzing unit. Further details on these components will be given in further detail below. The term "laser desorption mass spectrometric detection" as used herein is a broad term and is to be given its ordinary and customary meaning to a person of ordinary skill in the art and is not to be limited to a special or customized meaning. The term specifically may refer, without limitation, to a process of analyzing a sample by using a laser desorption mass spectrometer. The detection may specifically refer to an identifying of an analyte of a sample. The detection may be a qualitative and/or a quantitative detection. Further, specifically, the laser desorption mass spectrometric detection may be a laser desorption imaging mass spectrometric detection. The laser desorption imaging mass spectrometric detection may include a visualization of a spatial distribution of molecules by their molecular masses. After collecting a mass spectrum at one spot, the target may be moved to reach another region, and so on, until a region of the target is scanned. By choosing a peak in resulting spectra that Corresponds to an analyte of interest, its distribution across the target may be mapped.

The term "target" as used herein is a broad term and is to be given its ordinary and customary meaning to a person of ordinary skill in the art and is not to be limited to a special or customized meaning. The term specifically may refer, without limitation, to an arbitrary article, device or element which is exposed or exposable to a beam, specifically a laser beam. As an example, the target may be configured as a solid target having a predefined shape, such as a flat target disc or wafer having flat target surface and e.g. having a round, oval or polygonal shape. Specifically, the target may be exposed or may be exposable to a laser beam of a laser of a mass spectrometer, specifically of a laser desorption mass spectrometer. The target may specifically be a reusable target. The term "reusable target" as used herein is a broad term and is to be given its ordinary and customary meaning to a person of ordinary skill in the art and is not to be limited to a special or customized meaning. The term specifically may refer, without limitation, to an arbitrary target which may be configured for being used more than one time. As will be outlined in further detail below, a preparing of last one sample for analysis in a laser desorption mass spectrometer may include an applying at least one sample to the target. After conducting at least one measurement, the target, specifically a surface of the target, may be cleaned, e.g. the sample may be removed. Thereafter, a further sample may be applied to the target and a further measurement may be conducted.

The target may specifically have a thickness of 0.2 mm to 1 cm, preferably 0.5 mm to 3 mm. Further, the target may have a thickness of less than 1 cm, preferably of less than 3 mm.

The target may specifically comprise at least one substrate. The term "substrate" as used herein is a broad term and is to be given its ordinary and customary meaning to a person of ordinary skill in the art and is not to be limited to a special or customized meaning. The term specifically may refer, without limitation, to an arbitrary flat element, such as a flat element having a lateral extension exceeding its thickness by at least a factor of 2, at least a factor of 5, at least a factor of 10, or even at least a factor of 20 or more. The substrate may have an arbitrary shape. Specifically, the substrate may have a round, oval or polygonal shape, such as a rectangular or round shape. Further, as will be described in further detail below, the substrate may have a strip-shape. However, also other shapes may be feasible.

The substrate may be made of at least one electrically conductive material or may comprise at least one layer of the at least one electrically conductive material. The electrically conductive material may specifically have a sheet resistance which is smaller than or equal to 100 $\Omega$/sq, preferably smaller than or equal to 60 $\Omega$/sq. Thus, exemplarily, the substrate may be made of the least one electrically conductive material and the a-C:H:Si layer may be deposited on the surface of the substrate.

Further, exemplarily, the substrate may be made of at least one electrically insulating material or of the at least one electrically conductive material and at least one layer of at least one electrically conductive material may be deposited on the substrate. Thereby, the a-C:H:Si layer may be deposited on a surface of the layer of the at least one electrically conductive material. Thus, the a-C:H:Si layer may form an outermost layer of the target. The layer of the at least one electrically conductive material may form an intermediate layer of the target. Further, the target may comprise a layer structure having the at least one a-C:H:Si layer and the at least one layer of the at least one electrically conductive material. Specifically, the layer structure may comprise a plurality of the layers of the at least one electrically conductive material. The plurality of the layers of the at least one electrically conductive material may form intermediate layers of the target. Further, the layer structure may comprise one or more layers of at least one electrically insulating material. The layer of the at least one electrically conductive material may also be referred to as electrically conductive contact layer. The surface of the substrate or the surface of the layer of the at least one electrically conductive material on which the a-C:H:Si layer may be deposited may enable a good bonding of the a-C:H:Si layer to the surface of the substrate or to the surface of the layer of the at least one electrically conductive material. Exemplarily, the substrate may be made of glass and the electrically conductive material may be indium tin oxide (ITO). Thus, the substrate being made of glass may comprise at least one ITO layer and the a-C:H:Si layer may be deposited on a surface of the ITO layer. Further, a pretreatment, specifically a plasma treatment, of the surface of the substrate and/or of the intermediate layer may be conducted before the a-C:H:Si layer is deposited, specifically in order to increase an adhesion of the a-C:H:Si layer on the substrate.

Specifically, the substrate may at least partially be made of at least one material or may comprise at least one material which is selected from the group consisting of: glass; steel, specifically stainless steel; aluminum; silicon; germanium titanium; copper; cobalt; chromium; molybdenum; nickel; tungsten; tantalum; graphite; a polymeric material, specifically polyethylene, specifically polypropylene, specifically polycarbonate, specifically polystyrene, specifically polyacrylate. Further, the polymeric material may be a conductive polymeric material, specifically polyaniline, specifically poly(3,4-ethylenedioxythiophene) polystyrene sulfonate, specifically polypyrrole, specifically polythiophene. Also other materials may be feasible such as alloys which comprise at least one of the metals as outlined above and at least one further element.

The term "surface" as used herein is a broad term and is to be given its ordinary and customary meaning to a person of ordinary skill in the art and is not to be limited to a special or customized meaning. The term specifically may refer, without limitation, to an entirety of areas which delimit an arbitrary body from the outside. Thus, the body may have a plurality of surfaces. The term "layer" as used herein is a broad term and is to be given its ordinary and customary meaning to a person of ordinary skill in the art and is not to be limited to a special or customized meaning. The term specifically may refer, without limitation, to an amount of material which is deposited on a surface of an arbitrary element. The layer may specifically be a coating. The layer may cover the object completely or may only cover a part or parts of the object. The layer may specifically have a lateral extension exceeding its thickness by at least a factor of 2, at least a factor of 5, at least a factor of 10, or even at least a factor of 20 or more. Specifically, the a-C:H:Si layer may have a thickness of: 100 nm to 10 μm, preferably 500 nm to 1.5 μm. However, also other dimensions may be feasible.

The term "being at least partially covered" as used herein is a broad term and is to be given its ordinary and customary meaning to a person of ordinary skill in the art and is not to be limited to a special or customized meaning. The term specifically may refer, without limitation, to a property of an arbitrary element of being fully or partially covered with something. Specifically, a surface of the arbitrary element may be fully or partially covered with something. In case the surface is partially covered with something, the covered surface may also be referred to as surface section. As further used herein, the term "surface section" may refer to a part, specifically to a distinct part, of a surface. Exemplarily, the term surface section may refer to at least 5%, at least 10%, at least 20%, at least 30%, at least 40%, at least 50%, at least 60%, at least 70%, at least 80%, at least 90%, at least 95% of the surface. However, other embodiments may be feasible. The layer may specifically form a continuous layer covering a surface section or even a whole surface of the target, specifically of the substrate of the target.

The term "hydrogen comprising, silicon-incorporated amorphous carbon (a-C:H:Si) layer" as used herein is a broad term and is to be given its ordinary and customary meaning to a person of ordinary skill in the art and is not to be limited to a special or customized meaning. The term specifically may refer, without limitation, to an amorphous carbon layer, which comprises hydrogen and silicon. The hydrogen and/or the silicon, specifically, may be embedded or dispersed in the carbon layer without, however, being bound to the carbon by covalent chemical binding. The a-C:H:Si layer may specifically be an amorphous silicon-incorporated diamond-like carbon layer. The amorphous silicon-incorporated diamond-like carbon may have structural, mechanical, electrical, optical, chemical, and/or acoustic properties similar to those of diamond. Specifically, the amorphous silicon-incorporated diamond-like carbon may be a metastable form of amorphous carbon comprising $sp^3$ hybridized carbon atoms. More specifically, in the amorphous silicon-incorporated diamond-like carbon, the carbon may exist in three hybridizations, $sp^3$, $sp^2$, and $sp^1$. The physical properties of the amorphous silicon-incorporated diamond-like carbon as described above may derive from its mixture of carbon bonds. Specifically, the $sp^3$ hybridization, as in diamond, may have a strong a bond, which may lead to a high mechanical hardness and chemical inertness. The $sp^2$ hybridization, as in graphite, may have a strong intralayer a bond and a weak van der Waals bond between its layers. The physical properties may specifically depend on a ratio of $sp^2$ to $sp^3$ bonds.

The term "hydrogen comprising, silicon-incorporated, heteroatom modified, amorphous carbon (a-C:H:Si:X) layer" as used herein is a broad term and is to be given its ordinary and customary meaning to a person of ordinary skill in the art and is not to be limited to a special or customized meaning. The term specifically may refer, without limitation, to an amorphous carbon layer, which comprises hydrogen and silicon and which further, besides hydrogen and silicon, also comprises one or more kinds of heteroatoms. The hydrogen, the silicon, as well as the "heteroatom" may refer to any atom that differs from carbon or hydrogen. As outlined above, the heteroatom is selected from the group consisting of: oxygen, nitrogen, fluorine, boron. However, also other heteroatoms may be feasible. The heteroatom may specifically be selected from the group consisting of: a metalloid, specifically germanium, specifically antimony, specifically selenium, specifically tellurium; a post-transition metal, specifically aluminum; a transition metal, specifically titanium, specifically vanadium, specifically niobium, specifically tantalum, specifically chromium, specifically molybdenum, specifically tungsten, specifically iron, specifically cobalt, specifically copper, specifically silver; a nonmetal, specifically phosphorus, specifically sulfur, specifically chlorine, specifically bromine, specifically iodine.

A substrate having a surface which is covered at least partially with at least one layer comprising hydrogen comprising, silicon-incorporated amorphous carbon (a-CH:Si) is commercially available from e.g. CeWOTec GmbH (Chemnitzer Werkstoff-und Ober-flächentechnik, Chemnitz, Germany). CeWOTec GmbH provides a "technical data sheet for our XLC-PURA coating" including the information according to the following Table 1. The technical data sheet originates from Jan. 21, 2016 and the information is provided in the German language. The following table comprises a translation of the text into the English language.

| nomenclature | name according to VDI 2840 | a-C:H:Si:X (amorphous, hydrogen comprising carbon, modified with silicon and further non-metallic elements, completely free of metals) |
|---|---|---|
| | layer structure | gradient layer |
| | manufacturing method | PACVD, process temperature about 100-200° C. |
| | maximal component size | Ø 650 × 500 mm², max. 50 kg (more on request) |
| | layer thickness | typically 0.5 to 1.5 µm |
| | layer hardness | about 800-1.200 HK 0.05 |
| | friction coefficient, dry sliding against steel or carbide at a temperature of T < 100° C. | 0.03-0.15 (decreases with increasing surface pressure and sliding speed) |
| | normalized wear resistance during dry sliding against steel or carbide | 0.1-0.5 MJ/mm³, depending on the degree of modification and conditions of use |
| | adhesive strength on steel according to VDI 3198 | HF2-HF4, depending on the surface preparation |
| | temperature resistance in air | about 450° C. |
| | intrinsic roughness | Rz < 0.05 µm (topographically true) |
| | particularities | good non-stick behavior towards PUR, PI small change in dimension over the service life corrosion inhibiting very good chemical resistance moderate residual compressive stresses inner surfaces cannot be coated or only to a limited extent |
| | coloring | iridescent (rainbow-colored) or light brown transparent |
| | typical applications | as a wear-resistant demoulding aid when processing PUR (thermoset or TPE) and PI |
| | coatable materials (examples) | steel aluminum materials titan materials hard metals co- alloys |
| | non-coatable materials (examples) | precious and nonferrous metals, nickel, zinc, tin, lead | heteroatoms, specifically, may be embedded or dispersed in the carbon layer without, however, being bound to the carbon by covalent chemical binding. The a-C:H:Si:X layer may specifically be an amorphous heteroatom modified silicon-incorporated diamond-like carbon layer. The term As further outlined above, an elemental composition of the a-C:H:Si:X layer can be specified in 40 at. % to 80 at. % of carbon; 1 at. % to 20 at. % of hydrogen; 10 at. % to 40 at. % of silicon; up to 15 at. % of oxygen; up to 10 at. % of nitrogen; up to 10 at. % of boron; and up to 5 at. % of fluorine. As outlined above, a sum of oxygen, nitrogen, fluorine and boron is at least 1 at. %. Thus, the a-C:H:Si:X layer may comprise at least 1 at. % of one of the heteroatoms or some or all of the heteroatoms. Specifically, the sum of oxygen, nitrogen, fluorine and boron may be at least 5 at. %, preferably at least 10 at. %.

As outlined above, the a-C:H:Si layer comprises up to 15 at. % of oxygen. Specifically, a percentage of oxygen may vary within the a-C:H:Si layer. The closer a region of the a-C:H:Si layer is to the surface of the target, the lower may be the percentage of oxygen. Thus, within the a-C:H:Si layer, the percentage of oxygen may continuously or discontinuously decrease in a direction perpendicular to the surface of the target, i.e. the surface which is exposed to the laser radiation. In a bulk region of the a-C:H:Si layer the percentage of oxygen may be less than 1 at. %, specifically less than 0.1 at. %, more specifically less than 0.01 at. %.

As outlined above, the a-C:H:Si layer is an amorphous layer. The term "amorphous layer" as used herein is a broad term and is to be given its ordinary and customary meaning to a person of ordinary skill in the art and is not to be limited to a special or customized meaning. The term specifically may refer, without limitation, to an arbitrary layer being made of at least one material which lacks a long-range order. Thus, atoms of the material may form an irregular pattern and may only have a short-range order. However, the material may also have an internal structure made of interconnected structural blocks. The interconnected structural blocks may correspond to crystalline phase of the material. Specifically, the a-C:H:Si layer may be deposited on the surface of the target by a plasma-supported surface coating process. Specifically, the plasma-supported surface coating process may be a plasma assisted chemical vapor deposition process (PA-CVD). The PA-CVD may be performed by a process temperature of 100° C. to 200° C. The term "plasma assisted chemical vapor deposition" may generally refer to a deposition method wherein a substrate is exposed to one or more volatile precursors which react and/or decompose on a surface of the substrate to produce a desired deposit. However, also other deposition methods may be feasible.

Specifically, the a-C:H:Si layer may form an outermost layer of the target which may specifically face an outer environment of the target. Further, the a-C:H:Si layer may form a continuous layer on the surface of the target. Further, a structural shape of a surface of the a-C:H:Si layer may resemble a shape of the surface of the substrate. Specifically, on a smooth substrate, the a-C:H:Si layer may also form a continuous and smooth surface with only low numbers of defect positions.

The a-C:H:Si layer may have a microhardness of 2 GPa to 50 GPa, preferably of 5 GPa to 30 GPa, most preferably of 10 GPa to 25 GPa. However, also other values may be feasible. The term "microhardness", also be referred to as "indention hardness", as used herein is a broad term and is to be given its ordinary and customary meaning to a person of ordinary skill in the art and is not to be limited to a special or customized meaning. The term specifically may refer, without limitation, to a hardness of a material exposed to low applied loads. During testing of the microhardness, a diamond indenter of specific geometry may be impressed into a surface of a test specimen using a known applied force, which may also be referred to as load, such as of 2 N. Thereby, indentations of about 50 μm may be produced. Specifically, for the purpose of determining the microhardness of the material, a Vickers hardness test or a Knoop hardness test may be applied. However, also other methods may be feasible.

Specifically, the a-C:H:Si layer may have a friction coefficient of 0.01 to 0.3, preferably of 0.02 to 0.2, most preferably of 0.03 to 0.15. However, also other values may be feasible. The term "friction coefficient" as used herein is a broad term and is to be given its ordinary and customary meaning to a person of ordinary skill in the art and is not to be limited to a special or customized meaning. The term specifically may refer, without limitation, to a dimensionless value which describes a ratio of a force of friction between two bodies and a force pressing them together. Specifically, the term may refer to a static friction and may specifically be determined by dry sliding against steel or carbide at a temperature of less than 100° C.

In a further aspect of the present invention, a use of a target as described above or as will further be described below in more detail for a laser desorption mass spectrometric detection of at least one analyte in a sample is disclosed.

The term "analyte" as used herein is a broad term and is to be given its ordinary and customary meaning to a person of ordinary skill in the art and is not to be limited to a special or customized meaning. The term specifically may refer, without limitation, to an arbitrary chemical or biological substance or species, such as a molecule or a chemical compound, to be detected and/or measured. Specifically, a presence, an absence, a concentration and/or an amount of the analyte in a sample may be detected or measured. Specifically, the analyte may be a biological molecule or macromolecule. The analyte may be selected from the group consisting of a steroid; specifically a ketosteroid, specifically a secosteroid; a therapeutically active substance; a detergent; a glycoside; a peptide; a protein; a dye; an ion; a nucleic acid; an amino acid; a metabolite; a hormone; a fatty acid; a lipid; a carbohydrate. Further, the analyte may be a molecule characteristic of a certain modification of another molecule or a substance that has been internalized by an organism or a metabolite of such a substance or a combination thereof. However, also different kinds of analytes may be feasible. The steroid may be selected from the group consisting of: progesterone, testosterone, estradiol, androstenedione, cortisol, cortisone, 21-deoxycortisol. However, also other steroids may be feasible. The therapeutically active substance may be selected from the group consisting of: digitoxin, mycophenolic acid, theophylline, lidocaine, digoxin, voriconazole, 4-hydoxyalprazolam. However, also other therapeutically active substances may be feasible. The analyte may comprise permanently positive charged molecules or permanently negative charged molecules. Further, the analyte may have an isotope pattern. The analyte may have a molar mass from 6 Da to 10000 Da, preferably from 6 Da to 3000 Da, most preferably from 100 Da to 2000 Da. Specifically, Lithium may be de-sorbed having a molar mass of 6.9 Da.

The term "sample" as used herein is a broad term and is to be given its ordinary and customary meaning to a person of ordinary skill in the art and is not to be limited to a special or customized meaning. The term specifically may refer, without limitation, to an arbitrary sample such as a biological sample, also called test sample, a quality control sample, an internal standard sample. The sample may comprise one or more analytes of interest. The sample may specifically be a liquid sample, in particular a liquid sample comprising at least one biological material. Further, the analyte may be provided in a sample, specifically in a tissue sample or in a processed serum sample. The tissue sample may specifically have a slice thickness of less than 500 μm. For example, the sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, the sample may be pretreated by adding an internal standard and/or by being diluted with another solution and/or by being mixed with reagents or the like. The quality control sample may be a sample that mimics the test sample, and that comprises known values of one or more quality control substances. The quality control substance may be identical to the analyte of interest or may be an analyte which generates by reaction or derivatization an analyte identical to the analyte of interest and/or may be an analyte of which the concentration is known and/or may be a substance which mimics the analyte of interest or that can be otherwise correlated to a certain analyte of interest. The internal standard sample may be a sample comprising at least one internal standard substance with a known concentration.

In a further aspect of the present invention, a laser desorption mass spectrometer is disclosed. The laser desorption mass spectrometer comprises:

a) at least one target as described above or as will further be described below in more detail;

b) at least one laser, wherein the laser is configured for providing energy to the target such that at least one ion of at least one analyte is generated; and c) at least one of a mass analyzing unit, an ion-mobility spectrometry device.

The term "laser" as used herein is a broad term and is to be given its ordinary and customary meaning to a person of ordinary skill in the art and is not to be limited to a special or customized meaning. The term specifically may refer, without limitation, to an arbitrary device which is configured for emitting light through a process of optical amplification based on a stimulated emission of electromagnetic radiation. Specifically, the laser may be a pulsed laser. An energy of a pulse may be in a range of less than 60 µJ, specifically in a range of less than 35 µJ. Further, the laser may have a laser repetition rate in the range of 1 kHz to 5 kHz, specifically of 2 kHz to 3 kHz. For example, the laser may be configured for generating a laser beam in the UV spectral range. Specifically, a laser wavelength may be in the range between 300 nm to 400 nm. More specifically, the laser may be a neodymium-doped yttrium aluminum garnet laser (Nd:YAG laser) having a wavelength of 355 nm.

As outlined above, the laser is configured for providing energy to the target such that at least one ion of at least one analyte is generated. Thus, the target may be irradiated with at least one laser beam. The term "irradiating" as used herein, is a broad term and is to be given its ordinary and customary meaning to a person of ordinary skill in the art and is not to be limited to a special or customized meaning. The term specifically may refer, without limitation, to a process of exposing an object, specifically a surface of an object, to laser light. In particular, a first portion of the object, specifically a first portion of the surface of the object, may be irradiated with at least one laser beam and a second portion of the object, specifically a second portion of the surface of the object, may preferably not be irradiated with the at least one laser beam. Specifically, the target may absorb laser energy and transfer the laser energy to molecules of the sample and desorption and ionization may occur.

As outlined above, the laser desorption mass spectrometer may further comprise at least one mass analyzing unit. The mass analyzing unit may be configured for detecting or determining at least one mass-to-charge ratio of the at least one ion emitted from the target. The term "mass analyzing unit" as used herein is a broad term and is to be given its ordinary and customary meaning to a person of ordinary skill in the art and is not to be limited to a special or customized meaning. The term specifically may refer, without limitation, to an apparatus configured for detecting incoming ions. The mass analyzing unit may be configured for detecting charged particles. The mass analyzing unit may be or may comprise at least one electron multiplier. The mass analyzing unit may be configured for determining at least one mass spectrum of the detected ions. As used herein, the term "mass spectrum" is a broad term and is to be given its ordinary and customary meaning to a person of ordinary skill in the art and is not to be limited to a special or customized meaning. The term specifically may refer, without limitation, to a two-dimensional representation of signal intensity vs the mass-to-charge ratio m/z, wherein the signal intensity corresponds to abundance of the respective ion. The mass-to-charge ratio may refer to a reciprocal of a specific charge. The mass spectrum may be a pixelated image. For determining resulting intensities of pixels of the mass spectrum, signals detected with the mass analyzing unit within a certain m/z range may be integrated. The mass analyzing unit may comprise at least one evaluation device. The analyte in the sample may be identified by the at least one evaluation device. Specifically, the evaluation device may be configured for correlating known masses to the identified masses or through a characteristic fragmentation pattern.

Further, the laser desorption mass spectrometer may comprise at least one vacuum pump. The term "vacuum pump" as used herein is a broad term and is to be given its ordinary and customary meaning to a person of ordinary skill in the art and is not to be limited to a special or customized meaning. The term specifically may refer, without limitation, to an arbitrary device which is configured for drawing gas molecules from a sealed volume in order to leave behind a partial vacuum and/or for generating an underpressure, e.g. a pressure is below normal pressure. The vacuum pump may be configured for generating a relative vacuum within a capacity such as a sealed volume. The underpressure may be generated by allowing or forcing gas to flow from the sealed volume to the ambient atmosphere and/or to another room or chamber. Specifically, the vacuum pump may be configured to provide a pressure gradient between the sealed volume and the ambient atmosphere, wherein the value of the pressure within the sealed volume may be smaller than the value of the pressure of the ambient atmosphere. The vacuum pump may be configured for generating an underpressure below 1500 mbar, such as to a pressure of below 1000 mbar, below 100 mbar, below 90 mbar, below 80 mbar, below 70 mbar, below 60 mbar, below 50 mbar, below 40 mbar, below 30 mbar, below 20 mbar, below 10 mbar, below 5 mbar, below 1 mbar or even less. Specifically, the vacuum pump may be configured for generating an underpressure of 0 mbar to 1500 mbar, specifically of 0 mbar to 1000 mbar.

The laser desorption mass spectrometer may comprise at least one chamber. The vacuum pump may be configured for generating the underpressure within the chamber. The target may be received within the chamber. Further, the mass analyzing unit may be received within the chamber. Moreover, the laser desorption mass spectrometer may comprise at least one field generator. The field generator may be configured for generating an electric and/or magnetic field. The electric and/or magnetic field may be configured for drawing away generated ions from the target.

Further, the laser desorption mass spectrometer may comprise at least one ion-mobility spectrometry device having a least one ion-mobility spectrometry cell. The term "ion-mobility spectrometry device" as used herein is a broad term and is to be given its ordinary and customary meaning to a person of ordinary skill in the art and is not to be limited to a special or customized meaning. The term specifically may refer, without limitation, to an arbitrary analytical technique which is configured to separate and identify ionized molecules in a gas phase based on their mobility in a carrier buffer gas. The ion-mobility spectrometry device may specifically be coupled to the laser desorption mass spectrometer, specifically in order to achieve a multi-dimensional separation. The ion-mobility spectrometry device may be configured for detecting at least one drift time of the ion through the ion-mobility spectrometry cell.

In a further aspect of the present invention, a continuous laser desorption mass spectrometer system comprising at least one laser desorption mass spectrometer as described above or as will further be described below in more detail is disclosed. The target is provided as a material strip or as a stack of platelets.

The term "continuous laser desorption mass spectrometer system" as used herein is a broad term and is to be given its ordinary and customary meaning to a person of ordinary skill in the art and is not to be limited to a special or customized meaning. The term specifically may refer, without limitation, to an arbitrary desorption mass spectrometer system which is configured for measuring a plurality of samples successively, preferably without cessation between the measurements. The continuous laser desorption mass spectrometer system may also be referred to just as desorption mass spectrometer system.

As outlined above, the target is provided as a material strip or as a stack of platelets. In case the target is provided as a material strip, the target may specifically be provided in a coiled manner. The material strip may be configured to be unwound before one or more samples are applied to the material strip, specifically to a surface of the material strip. The material strip may be configured to pass through the continuous laser desorption mass spectrometer system. Specifically, the material strip may be configured to pass through different stations of the continuous laser desorption mass spectrometer system. The different stations may comprise the laser desorption mass spectrometer and may further comprise one or more liquid handling systems and one or more vacuum zones. Further details on the liquid handling system and the vacuum zone may be provided below in more detail. The material strip may specifically be made of steel or aluminum. However, also other materials may be feasible. The material strip may have a width of 0.5 cm to 10 cm, preferably of 1 cm to 3 cm. Further, the material strip may have a thickness of 0.2 mm to 2 mm, preferably of 0.5 mm to 1 mm. Further, the material strip may have a length of 5 m to 100 m. However, also other dimensions may be feasible. Specifically, the length of the material strip may not be limited. Specifically, the material strip may be manufactured by performing a coating of the substrate during a winding process. Thus, exemplarily, the a-C:H:Si layer may be formed on the surface of the substrate during the winding process. This manufacturing process may exemplarily also be referred to as roll to roll PA-CVD coating process.

Further, as outlined above, the target is provided as a stack of platelets. The platelets may specifically have a rectangular shape such as a square shape. However, also other shapes may be feasible such as a round shape. The platelets may specifically have a thickness of 0.2 mm to 1 cm, preferably of 0.5 mm to 3 mm. Further, the platelets may have a width in the range of 1 cm to 10 cm, preferably of 1 cm to 8 cm, most preferably of 1 cm to 5 cm. Further, the platelets may have a length in the range of 1 cm to 15 cm, preferably of 1 cm to 12 cm, most preferably of 1 cm to 7 cm.

The platelets may be provided as being stacked on top of each other. Specifically, the continuous laser desorption mass spectrometer system may comprise at least one platelet holder configured for receiving the stack of platelets. The platelet holder may be configured for releasing the platelets successively. Specifically, the continuous laser desorption mass spectrometer system may comprise at least one conveyor belt. The platelet holder may be configured for releasing the platelets successively on the conveyor belt. The conveyor belt may be configured for successively passing the platelets through the continuous laser desorption mass spectrometer system. Specifically, the conveyor belt may be configured for successively passing the platelets through the different stations of the continuous laser desorption mass spectrometer system.

Moreover, the continuous laser desorption mass spectrometer system may comprise the at least one liquid handling system. The liquid handling system may be configured for applying at least one sample having at least one analyte on the target, specifically on the material strip or on one of the platelets. The term "liquid handling system" as used herein is a broad term and is to be given its ordinary and customary meaning to a person of ordinary skill in the art and is not to be limited to a special or customized meaning. The term specifically may refer, without limitation, to an arbitrary device which is configured for applying liquid, specifically a defined or desired amount of liquid to another object. The amount of liquid may be adjustable. The liquid handling system may specifically comprise one or more pipetting units. The pipetting unit may comprise at least one chamber being configured for holding or receiving at least one liquid. The pipetting unit may be configured for creating a partial vacuum above the chamber and for selectively releasing the partial vacuum to draw up and dispense the liquid. Further, additionally or alternatively, the liquid handling system may comprise at least one acoustic droplet ejection unit. The acoustic droplet ejection unit may be configured for using a pulse of ultrasound to move volumes of fluids without any physical contact. However, also other embodiments may be feasible.

Further, the continuous laser desorption mass spectrometer system may comprise at least one vacuum system. The continuous laser desorption mass spectrometer system may be configured for passing the material strip or the platelets through the vacuum system. The term "vacuum system" as used herein is a broad term and is to be given its ordinary and customary meaning to a person of ordinary skill in the art and is not to be limited to a special or customized meaning. The term specifically may refer, without limitation, to an arbitrary device which is configured to create a vacuum, e.g. a region having a gaseous pressure which is below normal pressure, in a defined space such as a chamber. For this purpose, the vacuum system may comprise at least one vacuum pump. For further details on to the vacuum pump, reference can be made to the description of the vacuum pump above. Specifically, the vacuum system may comprise at least one vacuum zone, preferably at least two vacuum zones. The term "vacuum zone" may refer to a defined space such as a chamber having a gaseous pressure which is below normal pressure. The at least two vacuum zones may be arranged successively. The material strip or the stack of platelets may be configured for passing the vacuum system, specifically one or more of the vacuum zones before passing the laser desorption mass spectrometer. The vacuum zone may be configured for providing an underpressure below 1500 mbar, such as to a pressure of below 1000 mbar, below 900 mbar, below 800 mbar, below 700 mbar, below 600 mbar, below 500 mbar, below 400 mbar, below 300 mbar, below 200 mbar, below 100 mbar, below 90 mbar, below 80 mbar, below 70 mbar, below 60 mbar, below 50 mbar, below 40 mbar, below 30 mbar, below 20 mbar, below 10 mbar, below 1 mbar or even less. Specifically, the at least two vacuum zones may be configured for providing underpressure which differ from one each other. Also other parameters may be feasible. The vacuum system, specifically the vacuum zones, may be configured for drying the sample on the target.

In a further aspect of the present invention, a kit is disclosed.

The term "kit" as used herein is a broad term and is to be given its ordinary and customary meaning to a person of ordinary skill in the art and is not to be limited to a special or customized meaning. The term specifically may refer, without limitation, to a set of several items such as chemicals which are utilized for conducting a desired method, specifically for a sample preparation method and/or a sample analysis method. Specifically, the items may be provided in a housing, e.g. a packaging.

The kit comprises: (i) at least one target as described above or as will further be described below in more detail; and (ii) at least one internal standard.

As used herein, the term "internal standard" may refer to an analyte which is present with a defined concentration in a sample. Thus, specifically, the concentration of the internal standard may be known; it may be, however, also envisaged that the concentration of the standard is unknown, but is the same for at least the sample of interest and at least one calibration sample; in such case, specifically, the concentration of the internal standard may be the same for all samples analyzed. The internal standard may specifically be structurally similar or identical to the analyte. In particular, the internal standard may be an isotope-labelled molecule, specifically an isotope-labelled version of the analyte, e.g. a $^2$H (deuterated), $^{15}$N, and/or $^{13}$C-labelled derivative. The internal standard sample may be a sample comprising at least one internal standard substance with a known, e.g. pre-determined, concentration The kit may optionally comprise further elements. The further elements may be selected from the group consisting of: an auxiliary reagent, specifically a derivatization reagent; a bead suspension for a purification step.

In a further aspect of the present invention, a method for preparing at least one sample for analysis in a laser desorption mass spectrometer is disclosed.

The method comprises the following steps which specifically may be performed in the given order. It shall be noted, however, that a different order is also possible. Further, it is also possible to perform one or more of the method steps once or repeatedly. Further, it is possible to perform two or more of the method steps simultaneously or in a timely over-lapping fashion. The method may comprise further method steps which are not listed.

The method comprises:
i. providing at least one target according to any one of the embodiments described above or according to any one of the embodiments described in more detail below; and
ii. applying at least one sample to the target, wherein the sample comprises at least one analyte.

In step ii. the sample may be applied by a liquid handling system, preferably a pipetting unit, for applying the sample to the target. For further details on the liquid handling system reference may be made to the description above.

Further, the method may comprise the following step:
iii. drying the sample.

The step iii. may specifically be conducted after step ii. The step iii. may comprise a naturally drying of the sample on the target, e.g. a drying in the open air. Further, additionally or alternatively, the step iii. may comprise a drying of the sample via at least one vacuum system. For further details on the vacuum system, reference may be made to the description above.

Moreover, the method may additionally comprise at least one cleaning step. During the cleaning step, the a-C:H:Si layer may be cleaned. The cleaning step may be conducted before step ii. is conducted.

Specifically, the cleaning step may refer to an initial cleaning after a production process or manufacturing process of the target. Further, specifically, the cleaning step may be conducted after the a-C:H:Si layer is deposited on the surface of the target such as by a plasma supported surface coating process. Thus, the cleaning step may comprise a removal of impurities caused by the deposition process of the a-C:H:Si layer. Further, the cleaning step may comprise a removal of contamination such as with dust and dirt caused during storing of the target. The initial cleaning after the production process may increase a visibility of protonated pseudo molecular ions. However, the initial cleaning after the production process may only be optional. The target having the a-C:H:Si layer may also be suitable for the laser desorption mass spectrometric detection without conducting the initial cleaning after the production process.

Further, the cleaning step may refer to a cleaning after a previous application of the target. Thus, the cleaning step may comprise a removal of a sample which was previously applied to the target. Further, the cleaning step may comprise a removal of contamination such as with dust and dirt caused during storing of the target. Thus, the target may also be referred to as reusable target. For further details on the reusable target, reference may be made to the description above.

The cleaning step may specifically comprise a rinsing or sonication of the a-C:H:Si layer with at least one solvent. Specifically, the solvent may be deionized water. Further, the solvent may be an organic solvent, specifically an organic solvent mixture, specifically an organic solvent mixture with deionized water. The organic solvent may selected from the group consisting of: tetrahydrofuran, acetonitrile, methanol, ethanol. However, also other organic solvents may be feasible such as other hydrocarbons or alcohols.

In a further aspect of the present invention, a method for detecting at least one analyte in a sample with a laser desorption mass spectrometer is disclosed.

The method comprises the following steps which specifically may be performed in the given order. It shall be noted, however, that a different order is also possible. Further, it is also possible to perform one or more of the method steps once or repeatedly. Further, it is possible to perform two or more of the method steps simultaneously or in a timely over-lapping fashion. The method may comprise further method steps which are not listed.

The method comprises:

I. conducting a method for preparing at least one sample for analysis in a laser desorption mass spectrometer according to any one of the embodiments described above or according to any one of the embodiments described below in more detail; and II. detecting the at least one analyte in the sample with at least one laser desorption mass spectrometer according to any one of the embodiments described above or according to any one of the embodiments described below in more detail.

The methods and devices according to the present invention provide a large number of advantages over known methods and devices.

The presented invention presents an utilization of a plasma assisted surface modification of amorphous carbon (a-C:H:Si:X, wherein X=O, N, F and/or B). An elemental composition of the plasma assisted surface modification of amorphous carbon may be specified in ranges of 40 at. % to 70 at. % of carbon, 1 at. % to 20 at. % of hydrogen, 15 at. % to 40 at. % of silicon, up to 15 at. % of oxygen, up to 10 at. % of nitrogen, up to 10 at. % of boron and up to 5 at. % of fluorine. This may build up a surface with optimum mechanical strength and which may exhibit a very good SALDI ion species generation efficiency compared to non-functionalized substrates or different surface plasma process modifications. The substrate which may specifically be made of stainless steel or glass may specifically be modified via a plasma supported surface coating process. The gray steel may become a brownish/gold like color and may also become slightly iridescent. The target may specifically have a microhardness of the surface of 10 GPa to 25 GPa. The target may specifically have a friction coefficient of 0.03 to 0.15. To use the target the only sample-processing step may be pipetting and air-drying to gain a sufficient MS signal after laser irradiation. To clean the plate initially after the production process may enable or improve a visibility of protonated pseudo molecular ions.

Summarizing and without excluding further possible embodiments, the following embodiments may be envisaged:

Embodiment 1: A target for use in a laser desorption mass spectrometer, wherein the target has at least one surface, wherein the surface is covered at least partially with at least one layer, wherein the layer is a hydrogen comprising, silicon-incorporated amorphous carbon (a-C:H:Si) layer, wherein the a-C:H:Si layer comprises:

40 at. % to 80 at. % of carbon;

1 at. % to 20 at. % of hydrogen; and 10 at. % to 40 at. % of silicon.

Embodiment 2: The target according to the preceding embodiment, wherein the a-C:H:Si layer is a hydrogen comprising, heteroatom modified, silicon-incorporated amorphous carbon (a-C:H:Si:X) layer, wherein the heteroatom X is selected from the group consisting of oxygen, nitrogen, fluorine, boron, wherein the a-C:H:Si:X layer further comprises:

up to 15 at. % of oxygen;

up to 10 at. % of nitrogen;

up to 10 at. % of boron; and up to 5 at. % of fluorine;

wherein a sum of oxygen, nitrogen, fluorine and boron is at least 1 at. %.

Embodiment 3: The target according to any one of the preceding embodiments, wherein the a-C:H:Si layer is deposited on the surface of the target by a plasma supported surface coating process.

Embodiment 4: The target according to any one of the preceding embodiments, wherein the a-C:H:Si layer has a micro hardness of 2 GPa to 50 GPa, preferably of 5 GPa to 30 GPa, most preferably of 10 GPa to 25 GPa.

31 Embodiment 5: The target according to any one of the preceding embodiments, wherein the a-C:H:Si layer has a friction coefficient of 0.01 to 0.3, preferably of 0.02 to 0.2, most preferably of 0.03 to 0.15.

Embodiment 6: The target according to any one of the preceding embodiments, wherein the target comprises at least one substrate.

Embodiment 7: The target according to the preceding embodiment, wherein the substrate is made of at least one material which is selected from the group consisting of: glass; steel, specifically stainless steel; aluminum; silicon; germanium; titanium; copper; cobalt; chromium; molybdenum, nickel; tungsten; tantalum; graphite; a polymeric material, specifically polyethylene, specifically polypropylene, specifically polycarbonate, specifically polystyrene, specifically polyacrylate, specifically polyaniline, specifically poly (3,4-ethylenedioxythiophene) polystyrene sulfonate, specifically polypyrrole, specifically polythiophene.

Embodiment 8: The target according to any one of the two preceding embodiments, wherein the substrate is made of at least one electrically conductive material or wherein the substrate is made of at least one electrically insulating material and at least one layer of at least one electrically conductive material is deposited on the substrate.

Embodiment 9: The target according to any one of the preceding embodiments, wherein the target is a reusable target.

Embodiment 10: The target according to any one of the preceding embodiments, wherein the a-C:H:Si layer has a thickness of: 100 nm to 10 μm, preferably 500 nm to 1.5 μm.

Embodiment 11: Use of a target according to any one of the preceding embodiments for a laser desorption mass spectrometric detection of at least one analyte in a sample.

Embodiment 12: The use according to the preceding embodiment, wherein the analyte is selected from the group consisting of: a steroid; specifically a ketosteroid, specifically a secosteroid; a therapeutically active substance; a detergent; a glycoside; a peptide; a protein; a dye; an ion; a nucleic acid; an amino acid; a metabolite; a hormone; a fatty acid; a lipid; a carbohydrate.

Embodiment 13: The use according to any one of the four preceding embodiments, wherein the analyte has a molar mass from 6 Da to 10000 Da, preferably from 6 Da to 3000 Da.

Embodiment 14: The use according to any one of the five preceding embodiments, wherein the analyte comprises permanently positive charged molecules or permanently negative charged molecules.

Embodiment 15: The use according to any one of the six preceding embodiments, wherein the analyte has an isotope pattern.

Embodiment 16: The use according to any one of the seven preceding embodiments, wherein the analyte is provided in a sample, wherein the sample is selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue or cells.

Embodiment 17: The use according to any one of the eight preceding embodiments, wherein the laser desorption mass spectrometric detection is a laser desorption imaging mass spectrometric detection.

Embodiment 18: A laser desorption mass spectrometer comprising:

a) at least one target according to any one of the preceding embodiments referring to a target;

b) at least one laser, wherein the laser is configured for providing energy to the target such that at least one ion of at least one analyte is generated; and c) at least one of a mass analyzing unit, an ion-mobility spectrometry device.

Embodiment 19: The laser desorption mass spectrometer according to the preceding embodiment, wherein the laser desorption mass spectrometer further comprises:

d) at least one vacuum pump.

Embodiment 20: The laser desorption mass spectrometer according to the preceding embodiment, wherein the vacuum pump is configured for generating an underpressure of 0 mbar to 1500 mbar, specifically of 0 mbar to 1000 mbar.

Embodiment 21: The laser desorption mass spectrometer according to any one of the three preceding embodiments wherein the laser wavelength is in the range between 300 nm to 400 nm.

Embodiment 22: The laser desorption mass spectrometer according to any one of the four preceding embodiments, wherein the laser desorption mass spectrometer further comprises at least one ion-mobility spectrometry device having a least one ion-mobility spectrometry cell, wherein the ion-mobility spectrometry device is configured for detecting at least one drift time of the ion through the ion-mobility spectrometry cell.

Embodiment 23: A continuous laser desorption mass spectrometer system comprising at least one laser desorption mass spectrometer according to any one of the preceding embodiments referring to a laser desorption mass spectrometer, wherein the target is provided as a material strip or as a stack of platelets.

Embodiment 24: The continuous laser desorption mass spectrometer system according to the preceding embodiment, wherein the continuous laser desorption mass spectrometer system further comprises at least one liquid handling system, preferably at least one pipetting unit, wherein the liquid handling system is configured for applying at least one sample having at least one analyte on the target.

Embodiment 25: The continuous laser desorption mass spectrometer system according to any one of the two preceding embodiments, wherein the continuous laser desorption mass spectrometer system further comprises at least one vacuum system, wherein the continuous laser desorption mass spectrometer system is configured for passing the material strip or the platelets through the vacuum system.

Embodiment 26: The continuous laser desorption mass spectrometer system according to the preceding embodiment, wherein the vacuum system comprises at least one vacuum zone, preferably at least two vacuum zones.

Embodiment 27: A kit comprising (i) at least one target according to any one of the preceding embodiments referring to a target; and (ii) at least one internal standard.

Embodiment 28: Method for preparing at least one sample for analysis in a laser desorption mass spectrometer, wherein the method comprises:

i. providing at least one target according to any one of the preceding embodiments referring to a target; and ii. applying at least one sample to the target, wherein the sample comprises at least one analyte.

Embodiment 29: The method according to the preceding embodiment, wherein the method further comprises the following step:

iii. drying the sample.

Embodiment 30: The method according to any one of the two preceding embodiments, wherein step ii. comprises a liquid handling system, preferably a pipetting unit, for applying the sample to the target.

Embodiment 31: The method according to any one of the three preceding embodiments, wherein the method additionally comprises at least one cleaning step, wherein during the cleaning step, the a-C:H:Si layer is cleaned, wherein the cleaning step is conducted before step ii. is conducted.

Embodiment 32: The method according to the preceding embodiment, wherein the cleaning step comprises a rinsing or sonication of the a-C:H:Si layer with at least one solvent.

Embodiment 33: The method according to the preceding embodiment, wherein the solvent is deionized water.

Embodiment 34: The method according to any one of the two preceding embodiments, wherein the solvent is an organic solvent, specifically an organic solvent mixture, specifically an organic solvent mixture with deionized water.

Embodiment 35: The method according to the preceding embodiment, wherein the organic solvent is selected from the group consisting of: tetrahydrofuran, acetonitrile, methanol, ethanol.

Embodiment 36: Method for detecting at least one analyte in a sample with a laser desorption mass spectrometer, wherein the method comprises:

I. conducting a method for preparing at least one sample for analysis in a laser desorption mass spectrometer according to any one of the preceding embodiments referring to a method for preparing at least one sample for analysis in a laser desorption mass spectrometer; and II. detecting the at least one analyte in the sample with at least one laser desorption mass spectrometer according to any one of the preceding embodiments referring to a laser desorption mass spectrometer.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

In the Figures:

FIGS. 1A and 1B show exemplary embodiments of a target according to the present invention;

FIG. 2 shows an exemplary embodiment of a laser desorption mass spectrometer according to the present invention;

Figure 19:
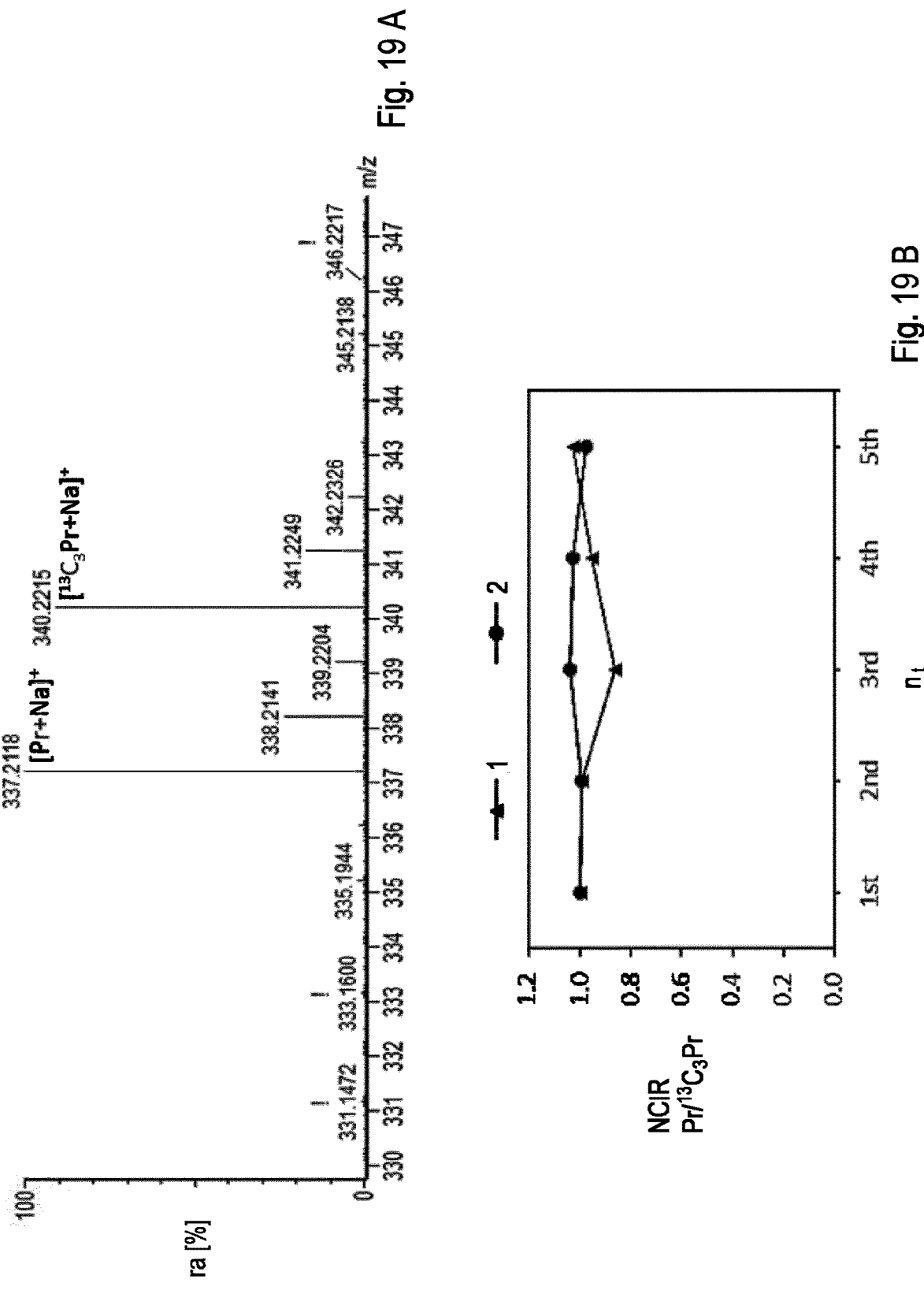
Figure 20:
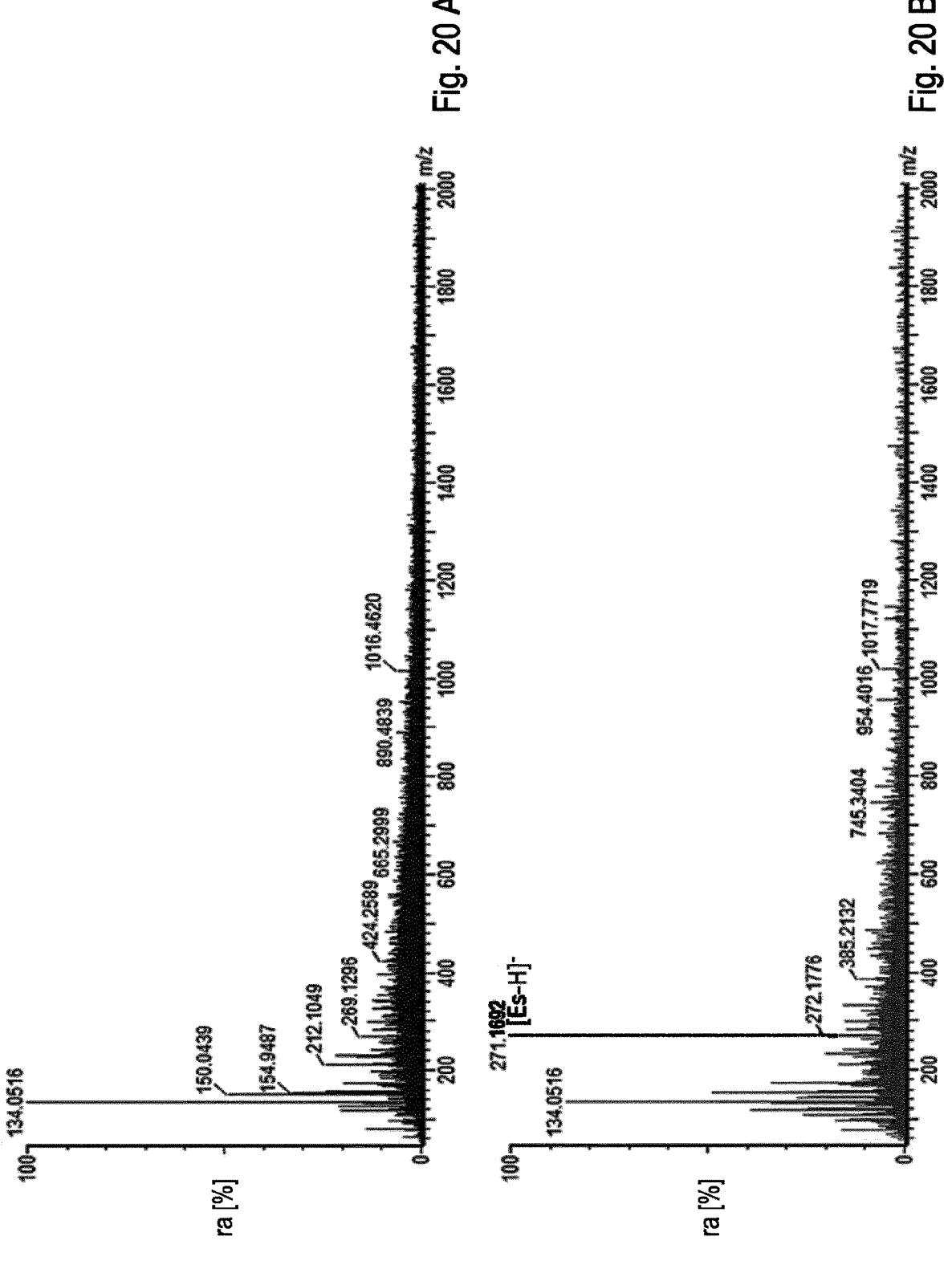
Figure 21:
Figure 21:

FIGS. 19A to 19B show a respective part (m/z 330 to m/z 348) of a full scan mass spectrum of [Pr+Na]⁺ and [$^{13}$C₃Pr+Na]⁺ resulting from a first SALDI-MS measurement on a heteroatom-modified hydrogen-comprising carbon surface with a laser intensity of 450 units (FIG. 19A) and a normalized combined intensity ratio Pr/$^{13}$C₃Pr of [M+H]⁺ and [M+Na]⁺ with N=2 plotted against the number of times the position was used (FIG. 19B);

FIGS. 20A to 20B show full scan SALDI mass spectra of a processed FFPE tonsillar tissue sample on a heteroatom-modified hydrogen-comprising carbon surface with the background of the tissue (FIG. 20A) and the tissue spiked with estradiol (FIG. 20B) operating in the negative ion mode with a laser intensity of 380 units; and FIGS. 21A to 21B show a spatial distribution of m/z 381.1 assigned to sucrose [M+K]⁺ as result from a SALDI imaging experiment of a garlic clove cross section on a heteroatom-modified hydrogen-comprising carbon surface (FIG. 21A) and a spatial distribution of m/z 527.1 probably assigned to dracorubin [M+K]⁺ as result from a SALDI imaging experiment of a garlic clove cross section on a heteroatom-modified hydrogen-comprising carbon surface (FIG. 21B).

DETAILED DESCRIPTION OF THE EMBODIMENTS

FIGS. 1A and 1B show exemplary embodiments of a target 110 according to the present invention.

As illustrated in FIG. 1A, the target 110 has at least one surface 112. The surface 112 is covered at least partially with at least one layer 114. The layer 114 is a hydrogen comprising, silicon-incorporated amorphous carbon (a-C:H:Si) 116. Specifically, the a-C:H:Si layer 116 may have a thickness t of: 100 nm to 10 µm. The target 110 may specifically comprise at least one substrate 118. The substrate 118 may exemplarily be made of steel. The surface 112 may be a surface of the substrate 118.

FIG. 1B shows a further embodiment of the target 110. The substrate may comprise at least one layer 174 of at least one electrically conductive material. The layer 174 of the at least one electrically conductive material may also be referred to as electrically conductive contact layer 176. Thereby, the a-C:H:Si layer 116 may be deposited on a surface 178 of the layer 174 of the at least one electrically conductive material. The layer 174 of the at least one electrically conductive material may form an intermediate layer and the a-C:H:Si layer 116 may be an outermost layer.

FIG. 2 shows an exemplary embodiment of a laser desorption mass spectrometer 120 according to the present invention.

The laser desorption mass spectrometer 120 comprises at least one target 110. The target 110 may correspond at least partially to the target 110 as depicted in FIG. 1. Thus, reference to the description of FIG. 1 above is made. Further, the laser desorption mass spectrometer 120 comprises at least one laser 122. The laser 122 is configured for providing energy to the target 110 such that at least one ion of at least one analyte is generated. Further, the laser desorption mass spectrometer 120 may comprise at least one mass analyzing unit 124. The mass analyzing unit 124 may be configured for detecting at least one mass-to-charge ratio of the at least one ion emitted from the target 110.

The laser desorption mass spectrometer 120 may comprise at least one chamber 126. Further, the laser desorption mass spectrometer 120 may comprise at least one vacuum pump 128. The vacuum pump 128 may be configured for generating an underpressure within the chamber 126. The underpressure may be generated by allowing or forcing gas to flow from the chamber to the ambient atmosphere which is schematically depicted with arrow 130.

The vacuum pump 128 may specifically be configured for generating an underpressure below 1500 mbar.

The laser 122 may specifically be a pulsed laser 132. The laser 122 may be configured for generating a laser beam in the UV spectral range. The laser 122 may be arranged relative to the target 110 such that the laser beam, which is schematically depicted with arrow 134, hits the target 110 at an angle of 10° to 90°, preferably of 30° to 70°. Specifically, the target 110 may absorb laser energy and transfer the laser energy to molecules of the sample and desorption and ionization may occur.

Moreover, the laser desorption mass spectrometer 120 may comprise at least one mass separating module 136. A setup of the mass separating module 136 may be dependent on an applied mass spectrometry technique.

The mass analyzing unit 124 having read-out electronics 138 may be received within the chamber 126. Further, the mass analyzing unit 124 may be arranged at a certain distance to the target 110. The mass analyzing unit 124 is configured for detecting or determining at least one mass-to-charge ratio of the at least one ion emitted from the target 110.

Figure 3:
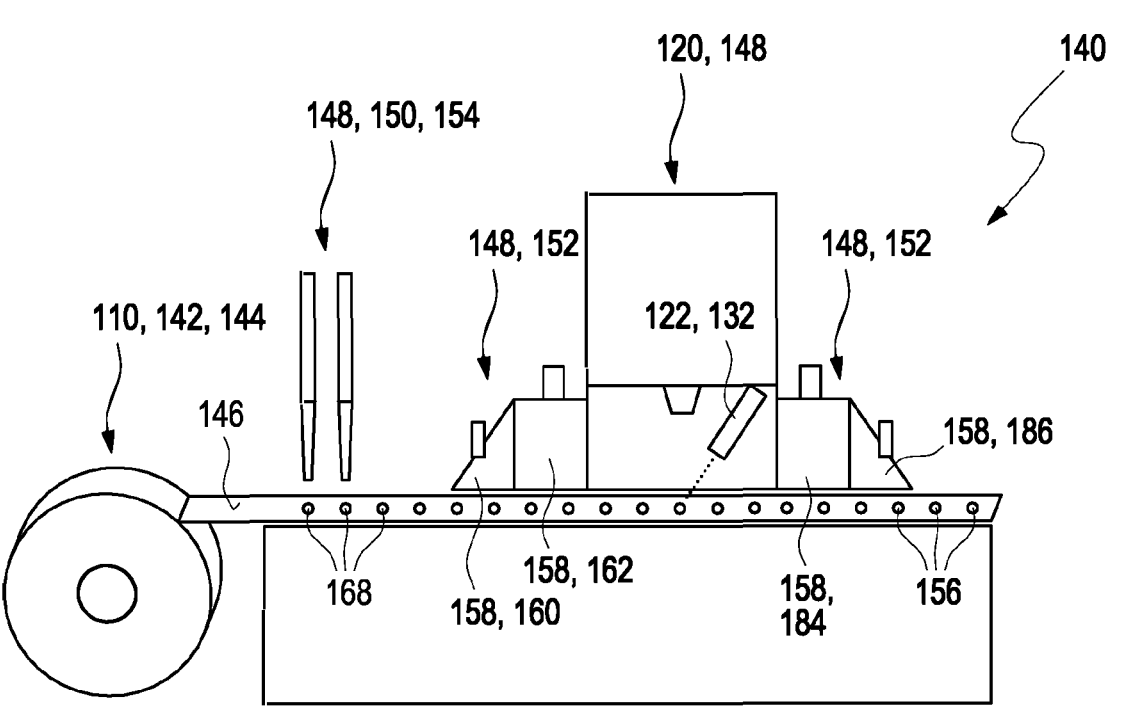
FIGS. 3A to 3B shows two different exemplary embodiments of a continuous laser desorption mass spectrometer system according to the present invention.
Figure 3:
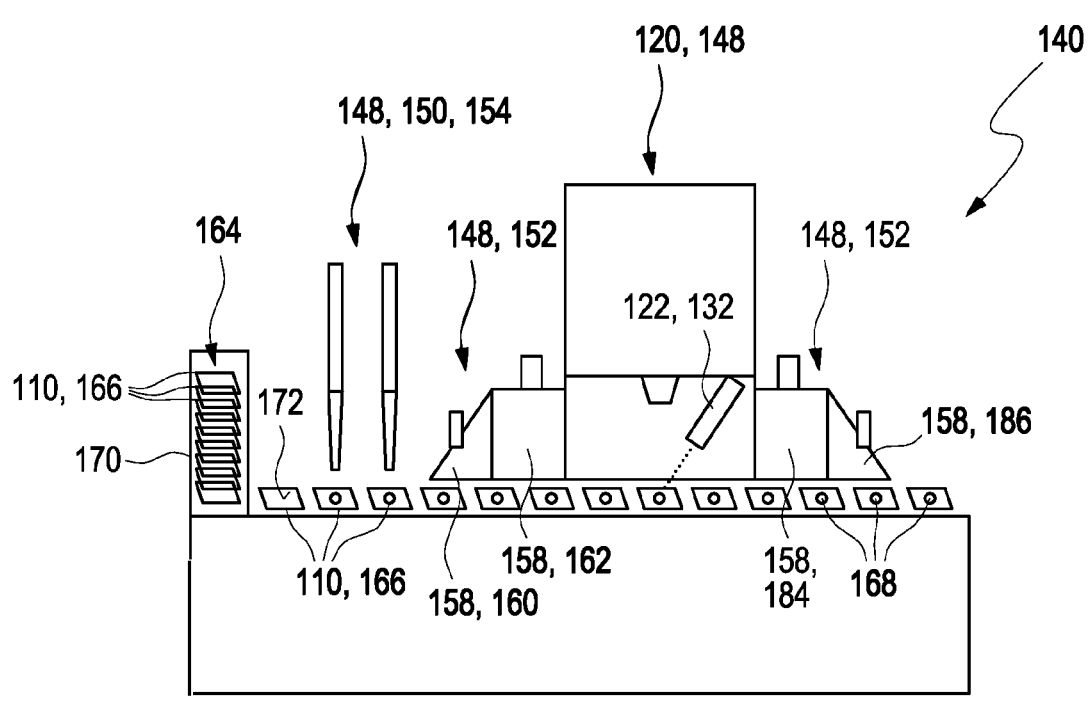

FIGS. 3A to 3B show two different exemplary embodiments of a continuous laser desorption mass spectrometer system 140 according to the present invention.

The continuous laser desorption mass spectrometer system 140 according to FIGS. 3A and 3B comprises at least one laser desorption mass spectrometer 120. The laser desorption mass spectrometer 120 corresponds at least partially to the laser desorption mass spectrometer 120 as depicted in FIG. 2. Thus, reference to the description of FIG. 2 above is made.

FIG. 3A shows the continuous laser desorption mass spectrometer system 140 wherein the target 110 is provided as a material strip 142. The material strip 142 may specifically be made of steel or aluminum. The material strip 142 may be rolled up to a role 144. The material strip 142 may be configured to be unwound before one or more samples are applied to the material strip 142, specifically to a surface 146 of the material strip 142. The material strip 142 may be configured to pass through the continuous laser desorption mass spectrometer system 140. Specifically, the material strip 142 may be configured to pass through different stations 148 of the continuous laser desorption mass spectrometer system 140. The different stations 148 may comprise the laser desorption mass spectrometer 120 and may further comprise one or more liquid handling systems 150 and/or a vacuum system 152.

The liquid handling system 150 may be configured for applying at least one sample 168 having at least one analyte on the target 110, specifically on the material strip 142. The liquid handling system 150 may specifically comprise one or more pipetting units 154. Specifically, the liquid handling system 150 may be configured for applying a plurality of samples 168 successively on different regions 156 of the material strip 142. The different regions 156 may be spaced apart from one another.

The vacuum system 152 may comprise one or more vacuum zones 158. The vacuum zones 158 may be arranged successively. The material strip 142 may be configured for passing the vacuum system 152, specifically one or more of the vacuum zones 158 before passing the laser desorption mass spectrometer 120. Specifically, the material strip 142 may be configured for passing at least one first vacuum zone 160 and at least one second vacuum zone 162 before passing the laser desorption mass spectrometer 120. The first vacuum zone 160 may be configured for providing a first underpressure and the second vacuum zone 162 may be configured for providing a second underpressure. The first underpressure may be higher than the second underpressure or vice versa. The first underpressure and the second underpressure may be below 1500 mbar. The vacuum system 152, specifically the vacuum zones 158, may be configured for drying the sample on the target 110. Further, the vacuum system 152 may comprise at least one third vacuum zone 184 and at least one fourth vacuum zone 186. Specifically, the material strip 142 may be configured for passing the at least one third vacuum zone 184 and the at least one fourth vacuum zone 186 after passing the laser desorption mass spectrometer 120. The third vacuum zone 184 and the fourth vacuum zone 186 may be configured for ensuring a continuous outward transfer and for keeping the vacuum in the laser region as low as technically possible at the same time, specifically for ensuring a reliable measurement.

The laser desorption mass spectrometer 120 may exemplarily comprise a quadrupole with subsequent ion trapping, isobaric separation via ion mobility, fragmentation in a collision cell and may be followed by quadrupole or time-of-flight (ToF) mass analysis. Other techniques of ion manipulations, like magnetic sector or ion trap, and different combinations of the corresponding units are also possible.

FIG. 3B shows the continuous laser desorption mass spectrometer system 140 wherein the target 110 is provided as a stack 164 of platelets 166. The platelets 166 may specifically have a rectangular shape such as a square shape. The platelets 166 may be made of steel, glass or aluminum. However, also other materials may be feasible. The platelets 166 may be provided as being stacked on top of each other. Specifically, the platelets 166 may be stored in a platelet holder 170. The platelet holder 170 may be configured for releasing the platelets 166 successively. Specifically, the continuous laser desorption mass spectrometer system 140 may comprise at least one conveyor belt (not shown). The platelet holder 170 may be configured for releasing the platelets 166 successively on the conveyor belt. The conveyor belt may be configured for successively passing the platelets 166 through the different stations 148 of the continuous laser desorption mass spectrometer system 140. Specifically, the conveyor belt may be configured for successively passing the platelets 166 through the liquid handling system 150. After individual collection of the platelets 166 out of the stack 164 the platelets 166 may be loaded with the sample 168 comprising an analyte solution by using the pipetting unit 154. The sample 168 may be pipetted on a surface 172 of the platelets 166. Further, the conveyor belt may be configured for successively passing the platelets 166 through the vacuum system 152 and the laser desorption mass spectrometer 120. For further details on the liquid handling system 150, the vacuum system 152 and the laser desorption mass spectrometer 120, reference may be made of the description of FIG. 3A above.

EXAMPLES

The following examples serve to illustrate the invention. They must not be interpreted as limiting with regard to the scope of protection.

For the following examples samples comprising analytes were prepared. Specifically, the analytes were selected from steroids and therapeutically relevant substances. For some of the following examples, a mixture of seven naturally occurring steroids was prepared. The naturally occurring steroids (S) were selected from the group consisting of: Progesterone (Pr), Testosterone (Te), Estradiol (Es), Androstenedione (S7), Cortisol (S9), Cortisone (S10), 21-Deoxycortisol (S19). A concentration of each of the naturally occurring steroids was 14 μg/mL and the solvent was a mixture of deionized water and acetonitrile ($H_2O$/MeCN=80/20). Further, a mixture of seven therapeutically substances (T) was prepared. The therapeutically substances were selected from the group consisting of: Digitoxin (T7), Mycophenolic acid (T16), Theophylline (T29), Lidocain (T37), Digoxin (T41), Voriconazole (T62), 4-Hydroxyalprazolam (4OHAlp). A concentration of each of the therapeutically substances was 14 μg/mL and the solvent was a mixture of deionized water and acetonitrile ($H_2O$/MeCN=80/20). 4OHAlp was ordered from Enzo Life Sciences Inc. The deionized water was obtained from a Milli-Q® water purification system from Merck KGaA, acetonitrile and methanol were ordered from Biosolve BV, tetrahydrofurane was ordered from Merck KGaA. The remaining chemicals were ordered from Sigma-Aldrich Inc.

The measurements were performed on a Maldi-Synapt-G2Si mass spectrometer (Waters Inc.), which is also capable of quadrupole mass filtering and ion mobility separation. The laser repetition rate was set to 2.5 kHz for the imaging experiments and to 1.0 kHz for all other measurements, with a Nd:YAG-laser wavelength of 355 nm. Analyte spots were each measured by a linear profile and a plate movement of 40 Hz during the laser irradiation. The laser intensity could be varied in a relative scale of up to 500, resembling a maximum is output energy of 30 μJ. Individual voltage settings were set to the following gradient parameters: 'Sample plate' 0.0 V, 'Extraction' 10.0 V, 'Hexapole' 10.0 V and 'Aperture 0' 5.0 V, as well as a hexapole RF amplitude of 350 V.

The mass spectra as described below in more detail show a relative abundance ra in % in dependence of the mass-to-charge ratio m/z.

Example 1

As a first example a screening of a laser desorption ionization performance of different surface coatings was conducted.

FIGS. 4A to 4G show mass spectra of the steroid mix measured on different targets having different surface coatings at a laser intensity of 400 in comparison, normalized to a highest peak intensity.

FIGS. 5A to 5G show mass spectra of the steroid mix measured on different targets having different surface coatings at a laser intensity of 400 in comparison, normalized to a highest peak intensity having individual enlargements in the range between m/z 270 to m/z 405.

Figure 4:
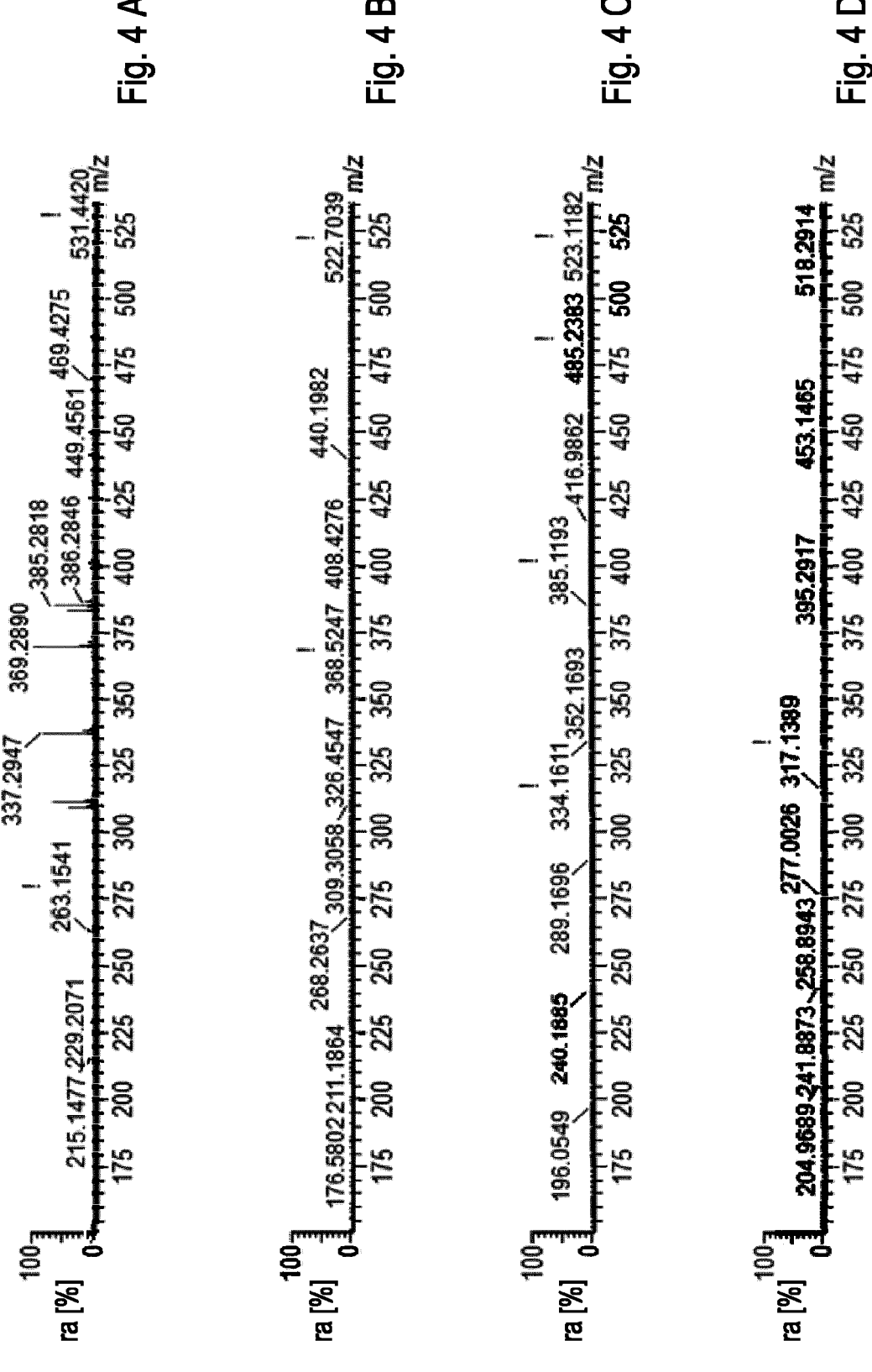
FIGS. 4A to 4G show mass spectra of the steroid mix measured on different targets having different surface coatings at a laser intensity of 400 in comparison, normalized to a highest peak intensity.
Figure 4:
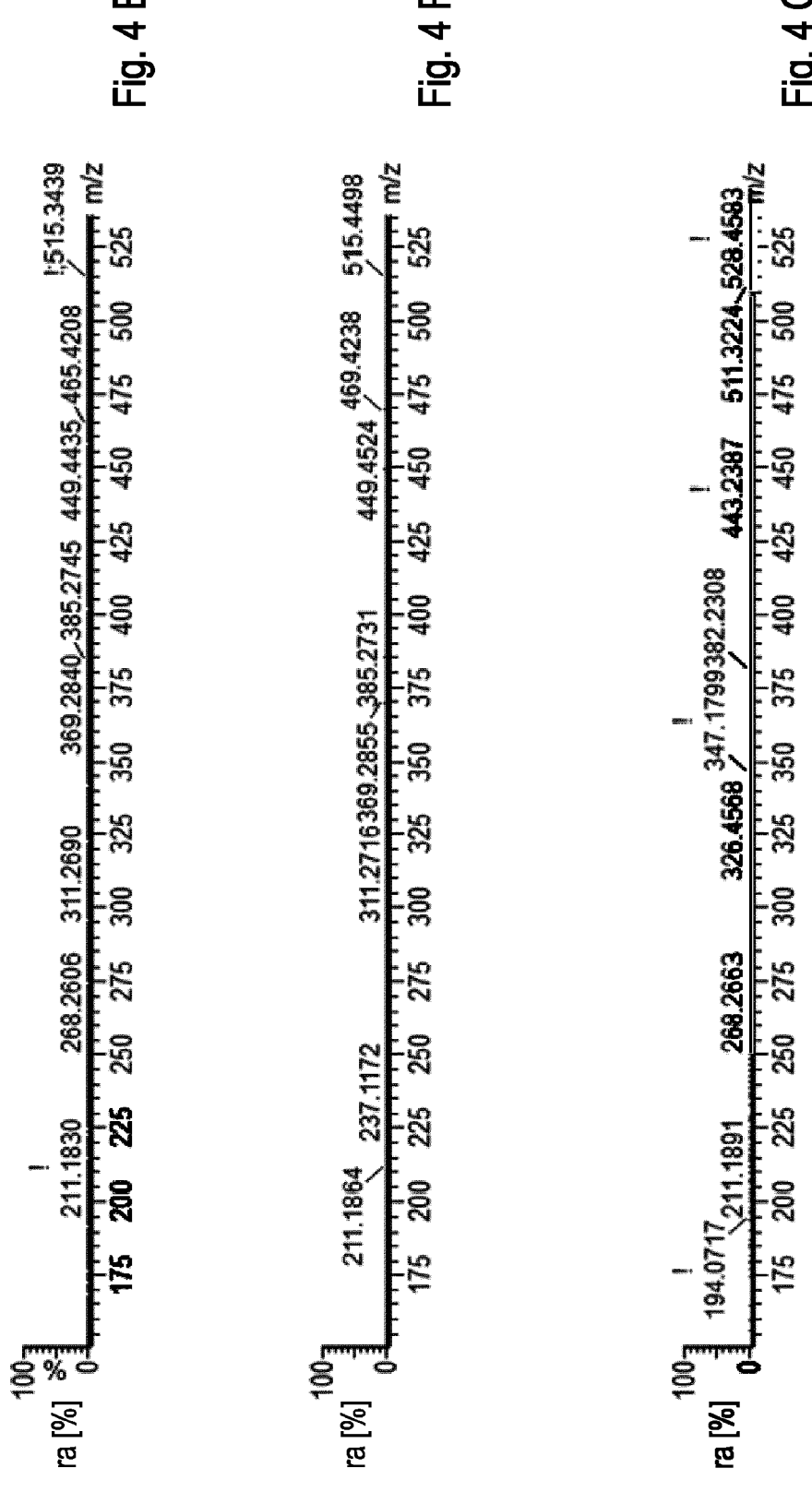
Figure 5:
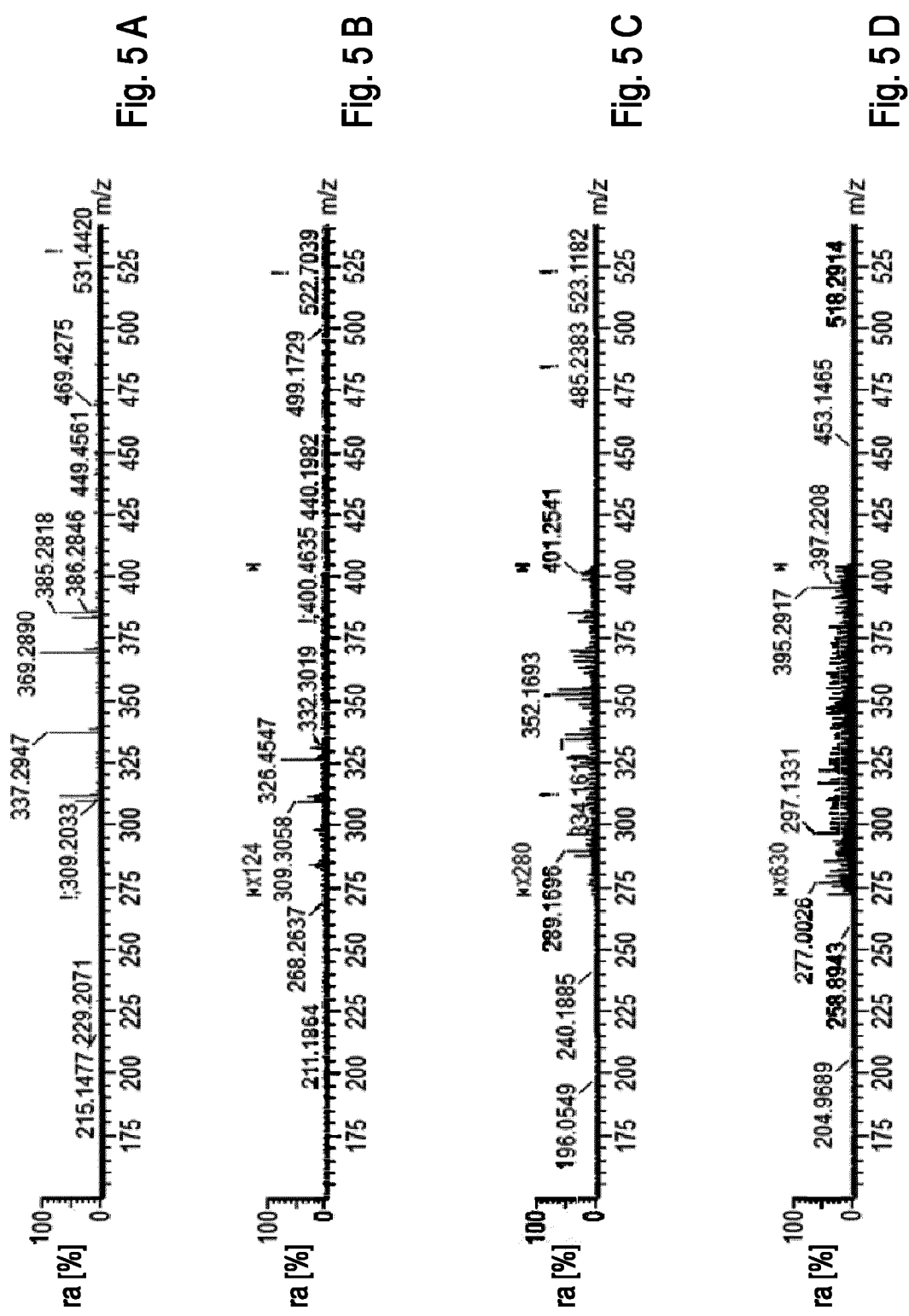
FIGS. 5A to 5G show mass spectra of the steroid mix measured on different targets having different surface coatings at a laser intensity of 400 in comparison, normalized to a highest peak intensity having individual enlargements in the range between m/z 270 to m/z 405.
Figure 5:
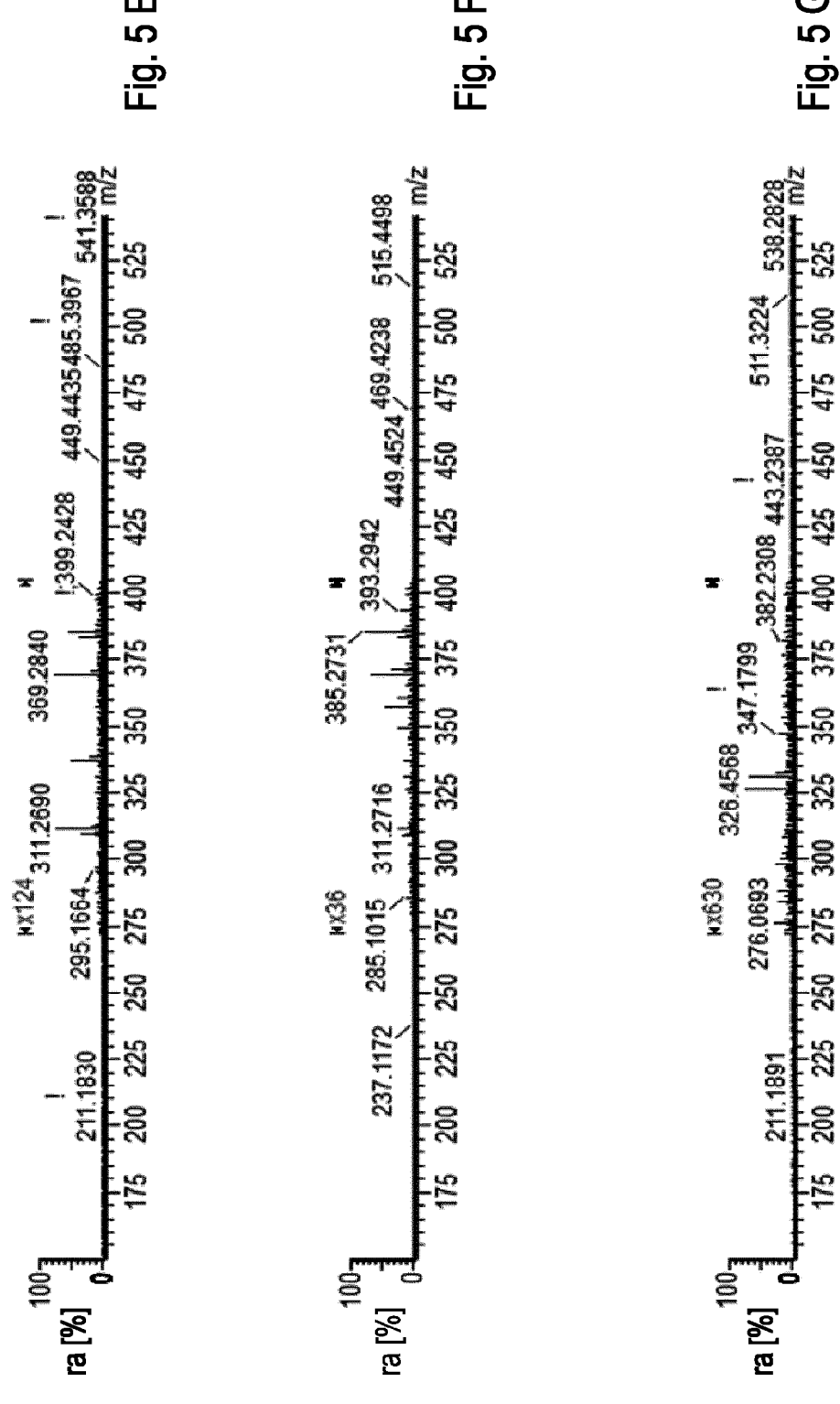

Different types of targets were tested. The substrate of the targets were respectively made of steel. The mass spectra as depicted in FIGS. 4A and 5A were obtained by utilizing an a-C:H:Si:X layer. Thereby, the targets were respectively coated via plasma assisted chemical vapor deposition. The mass spectra as depicted in FIGS. 4B and 5B were obtained by utilizing a diamond like carbon layer (DLC, C≈91 at. %, H≈5 at. % and Si≈4 at. %). Thereby, the targets were respectively coated via plasma assisted chemical vapor deposition. The mass spectra as depicted in FIGS. 4C and 5C were obtained by utilizing an electrostatic dissipative diamond-like carbon layer, comprising a-C:H:Si:N (C≈74 at. %, H≈5 at. %, Si≈2 at. % and N≈19 at. %). Thereby, the targets were respectively coated via plasma assisted chemical vapor deposition.

The mass spectra as depicted in FIGS. 4D and 5D were obtained by utilizing a titanium carbon nitride (TiCN) layer. Thereby, the targets were respectively coated via physical vapor deposition (PVD). The mass spectra as depicted in FIGS. 4E and 5E were obtained by utilizing a titanium carbide/titanium nitride (TiC/TiN) layer. Thereby, the targets were respectively coated via high temperature chemical vapor deposition. The mass spectra as depicted in FIGS. 4F and 5F were obtained by utilizing a titanium aluminum nitride is (TiAlN) layer. Thereby, the targets were respectively coated via physical vapor deposition. The mass spectra as depicted in FIGS. 4G and 5G were obtained by utilizing a titanium nitride (TiN) layer. Thereby, the targets were respectively coated via physical vapor deposition.

Direct spotting of 1 μL of the steroid-mix and measuring using the as described voltage settings with a laser energy of 400, resulted in the mass spectra shown in FIGS. 4A to 4G as well as in FIGS. 5A to 5G. FIGS. 5A to 5G show individual enlargements in the range between m/z 270 to m/z 405. As shown in FIGS. 4A and 5A, the a-C:H:Si:X layer hereby evinced superior capabilities in the desorption and ionization of the tested steroid analytes, specifically without revealing noticeable own background signals. The steroids Progesterone, Testosterone, Androstenedione, Cortisol, Cortisone and 21-Deoxycortisol all appeared as sodium adducts $[M+Na]^+$ in the positive ion mode from the untreated surface of the a-C:H:Si:X layer. Similar to that, as shown in FIGS. 4E and 4F as well as in FIGS. 5E and 5F, TiC/TiN and TiAlN also demonstrated certain capabilities in SALDI-MS analysis, resulting mainly in the formation of sodiated adducts $[M+Na]^+$, but with less intensity, compared to the heteroatom-modified hydrogen-comprising carbon. As shown in FIGS. 4C and 5C, the a-C:H:Si:N layer even resulted in the detection of some $[M+H]^+$ and $[M+K]^+$ steroid adducts, but also in the formation of background signals itself. Summarizing, it can be conducted that a high percentage of silicon in the a-C:H:Si:X layer was decisive for a significantly better performance in comparison to the a-C:H:Si:N layer. Contrary, as shown in FIGS. 4B and 5B, the DLC layer just showed traces of desorption and ionization of $[S7+Na]^+$ and $[Te+Na]^+$, but other steroid analytes could not be recognized. Thus, a diamond-like carbon layer having a small percentage of silicon may be applicable but may not evince superior capabilities. Further, as shown in FIGS. 4D and 4G as well as in FIGS. 5D and 5G, TiCN and TiN resulted in no laser desorption ionization of the analytes at all.

Example 2

As a second example an analyte scope regarding SALDI-MS on a-C:H:Si:X layers was evaluated.

In order to assure a broad applicability of the herein described a-C:H:Si:X layers in the desorption and ionization of analytes, obtained by ultraviolet laser irradiation, a broad range of low molecular weight compounds was tested. These analytes were selected to represent important therapeutic or metabolic substances, as well as a broad scope of different functionalities and molecular weights in both, the positive and negative ionization is mode. Additionally, a formation of protonated adducts in the positive ionization, instead of the formation of alkali adducts, was investigated. This would be an important achievement, due to the incompatibility of tandem mass spectrometry experiments of several alkali adducts, especially with steroid analytes.

Figure 6:
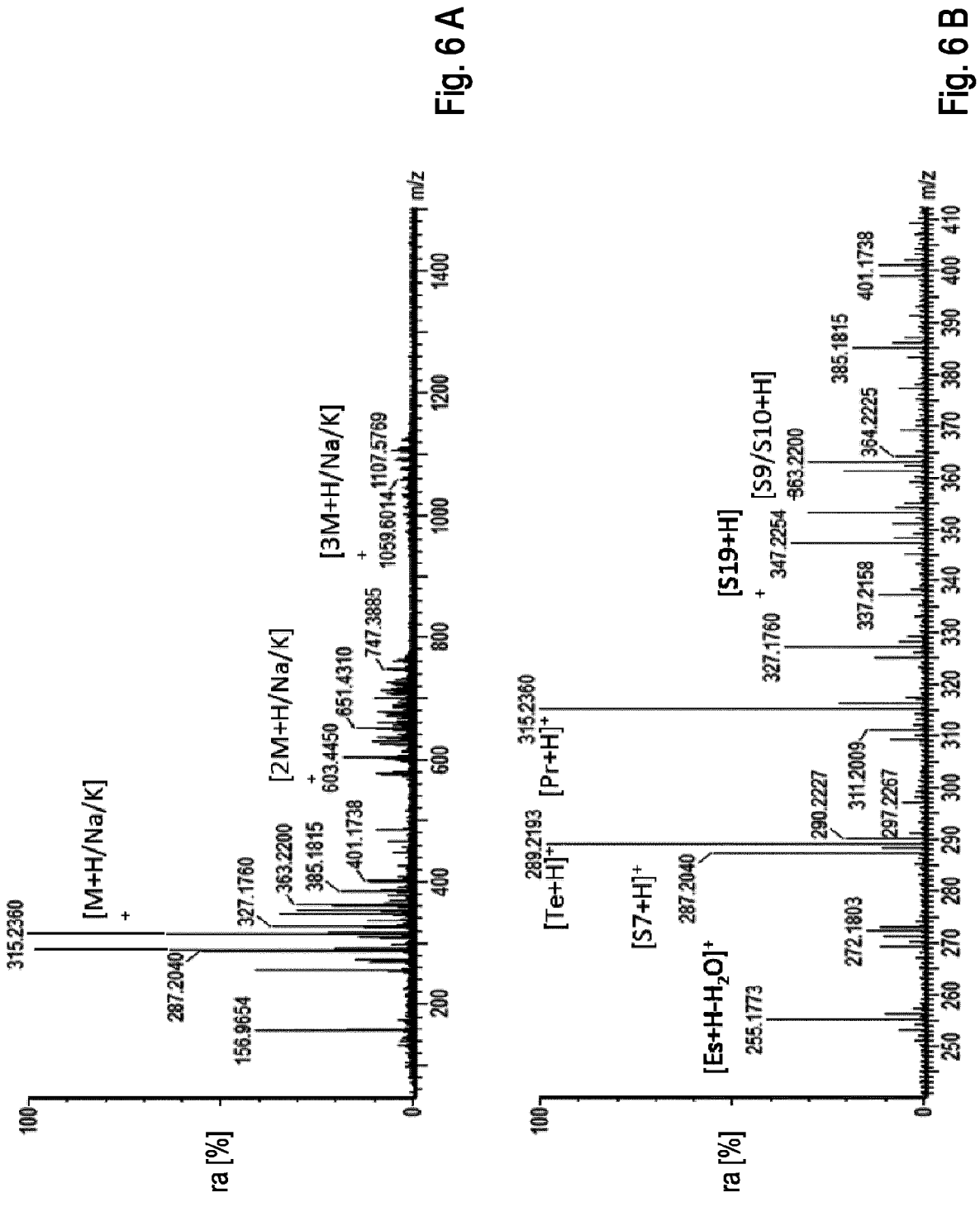
FIGS. 6A to 6B show a full scan mass spectrum of the steroid mix measured on a purified heteroatom-modified hydrogen-comprising carbon surface at a laser energy of 380 in the positive ion mode (FIG. 6A) with a respective enlargement in the mass range between m/z 240 to m/z 410 (FIG. 6B)

To favor the formation of protonated adducts over the alkali species, a purification of the heteroatom-modified hydrogen-comprising carbon coating was conducted as well as the optimization of the laser energy during SALDI measurement. The purification of the surface coating aimed the reduction of alkali ions absorbed on the surface and could be achieved by simply rinsing with a sufficient amount of solvents, for example tetrahydrofuran, deionized water and acetonitrile. The surface-enhanced laser desorption/ ionization measurement of 1 μL of the steroid mix previously dried on the herein described purified heteroatom-modified hydrogen-comprising carbon surface coating resulted at a laser intensity of 380 in the preferential formation of protonated adducts [M+H]$^+$ of the steroids Pr, Te, S7, S9, S10, S19 as well as the water loss of estradiol [Es+H–H$_2$O]$^+$ in the positive ion mode, as can be seen in FIGS. 6A and 6B. FIGS. 6A and 6B show a full scan mass spectrum of the steroid mix measured on a purified heteroatom-modified hydrogen-comprising carbon surface at a laser energy of 380 units in the positive ion mode (FIG. 6A) with a respective enlargement in the mass range between m/z 240 to m/z 410 (FIG. 6B). Even some multiple steroid adducts, for example m/z 603.4 [Te+Pr+H]$^+$ could be observed. Beside the protonated species, some minor sodiated and potassiated steroid adducts also occurred.

Figure 7:
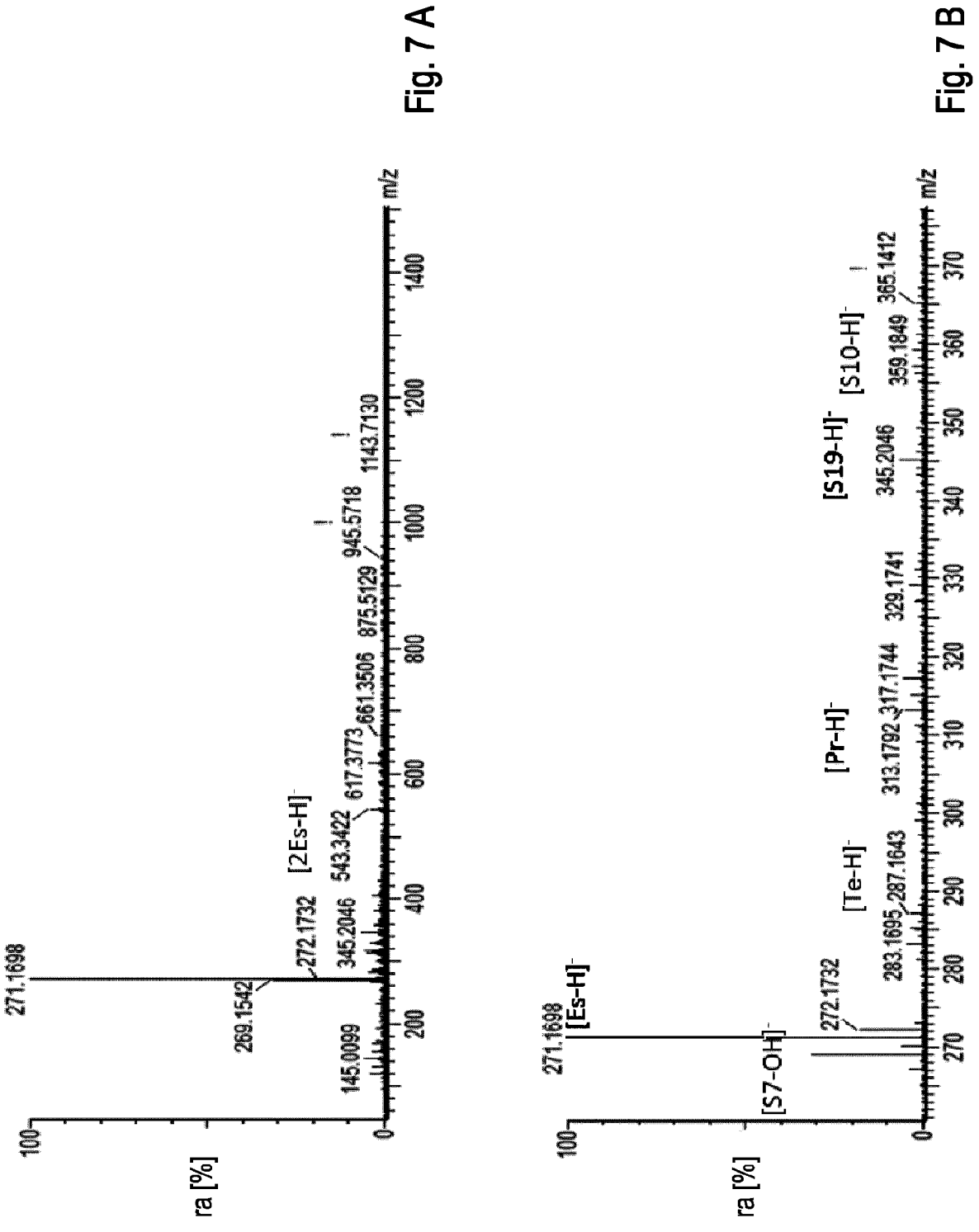
FIGS. 7A to 7B show a full scan mass spectrum of the steroid mix measured on the purified heteroatom-modified hydrogen-comprising carbon surface at a laser energy of 380 in the negative ion mode (FIG. 7A) with a respective enlargement in the mass range between m/z 250 to m/z 380 (FIG. 7B)

Another important aspect regarding the usability of the herein described heteroatom-modified hydrogen-comprising carbon coating is specifically the laser desorption and ionization of analytes in the negative ionization mode. This was also tested after drying 1 μL of the steroid mix on the purified heteroatom-modified hydrogen-comprising carbon surface and starting the measurement by irradiation with a laser intensity of 380 units. The corresponding full scan mass spectrum as well as an enlargement of the relevant range is given in FIGS. 7A and 7B. FIGS. 7A and 7B show a full scan mass spectrum of the steroid mix measured on the purified heteroatom-modified hydrogen-comprising carbon surface at a laser energy of 380 units in the negative ion mode (FIG. 7A) with a respective enlargement in the mass range between m/z 250 to m/z 380 (FIG. 7B). Here, the most abundant signal in the negative ionization mode belongs to estradiol [Es–H]$^-$, but also most of the other steroids could be detected. This result proves the ability of the heteroatom-modified hydrogen-comprising carbon surface for the analysis of steroids by laser desorption and ionization.

Figure 8:
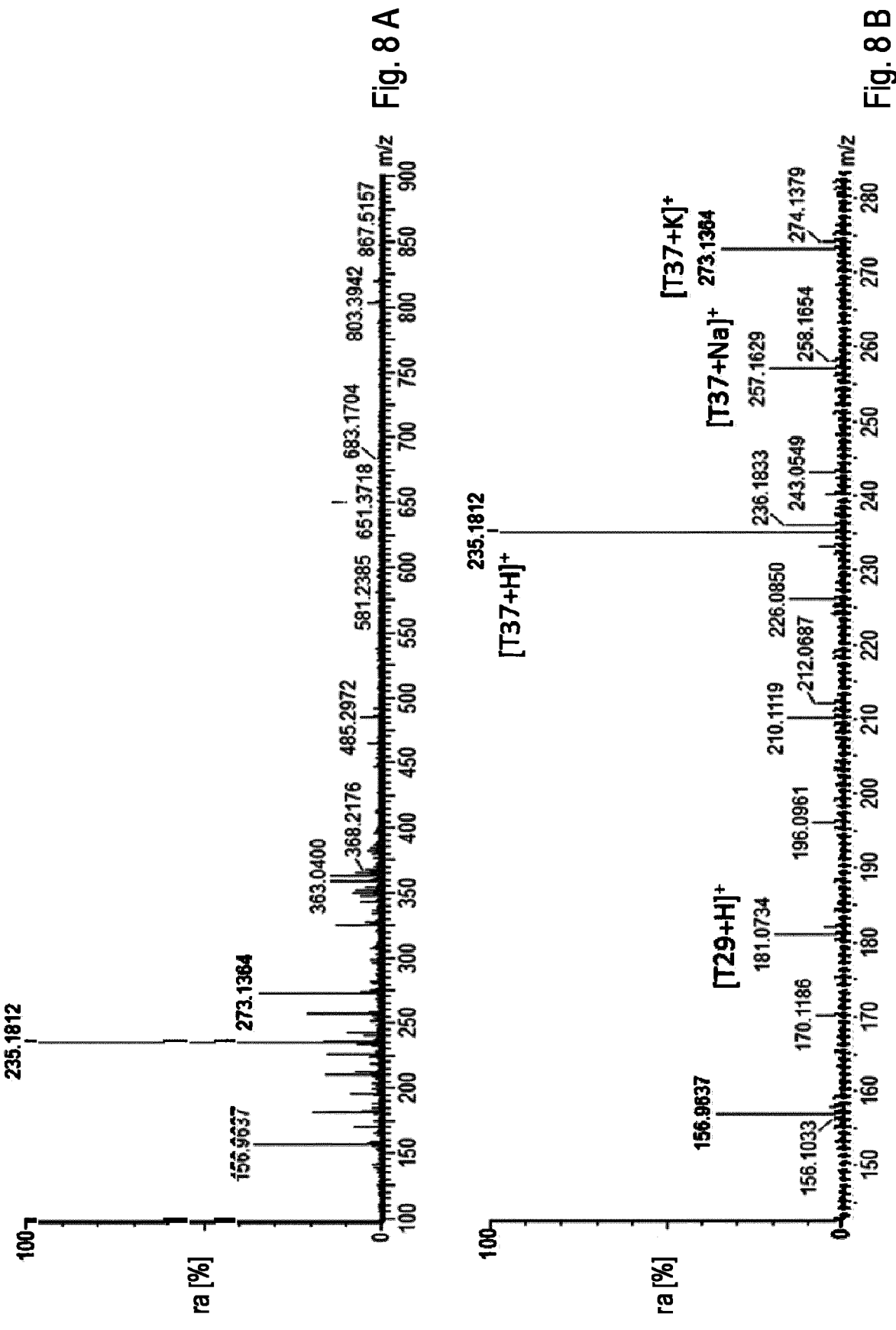
FIGS. 8A to 8D show a full scan mass spectrum of a therapeutic mix measured on the purified heteroatom-modified hydrogen-comprising carbon surface at a laser energy of 380 in the positive ion mode (FIG. 8A) with the respective enlargements in the mass ranges between m/z 135 to m/z 285 (FIG. 8B), m/z 315 to m/z 395 (FIG. 8C) and m/z 775 to m/z 830 (FIG. 8D)
Figure 8:
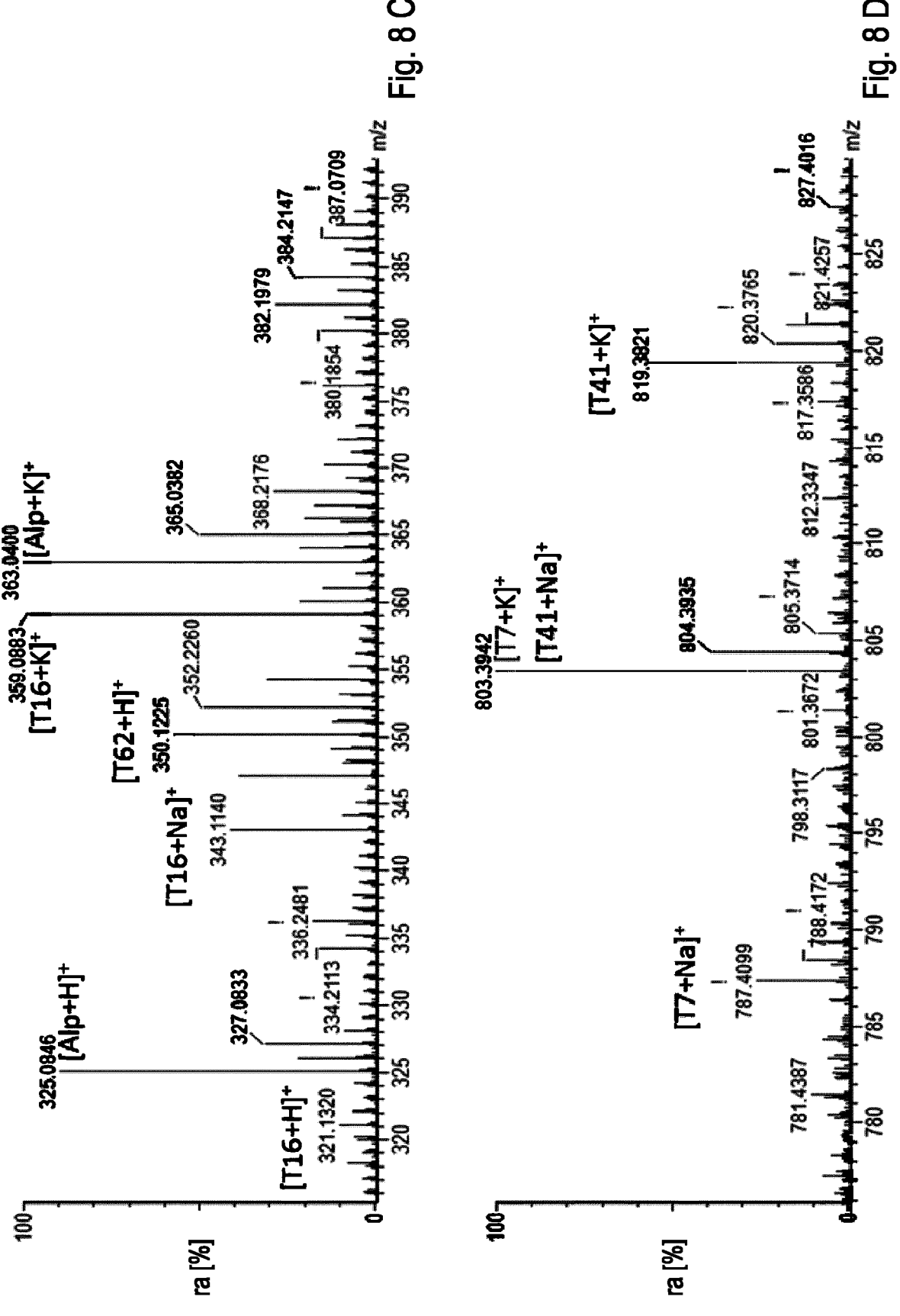

A further screening regarding the scope of analytes was performed using therapeutic relevant substances that represent a variety of organic functional groups (for example acid, amide, amine, glycoside, halide, hydroxyl, aromatic or heteroaromatic moieties). Therefore, 1 μL of the therapeutic mix was dried on the purified heteroatom-modified hydrogen-comprising carbon surface and was measured by laser irradiation with an intensity of 380 units. A resulting full scan mass spectrum, as well as the corresponding enlargements, are given in FIGS. 8A to 8D. FIGS. 8A to 8D show a full scan mass spectrum of a therapeutic mix measured on the purified heteroatom-modified hydrogen-comprising carbon surface at a laser energy of 380 units in the positive ion mode (FIG. 8A) with the respective enlargements in the mass ranges between m/z 145 to m/z 285 (FIG. 8B), m/z 315 to m/z 395 (FIG. 8C) and m/z 775 to m/z 830 (FIG. 8D). All seven therapeutic relevant substances Alp, T7, T10, T16, T29, T41 and T62 were detected in the positive ionization mode, either as protonated adducts [M+H]$^+$ or as the alkaline adducts [M+Na/K]$^+$.

Figure 9:
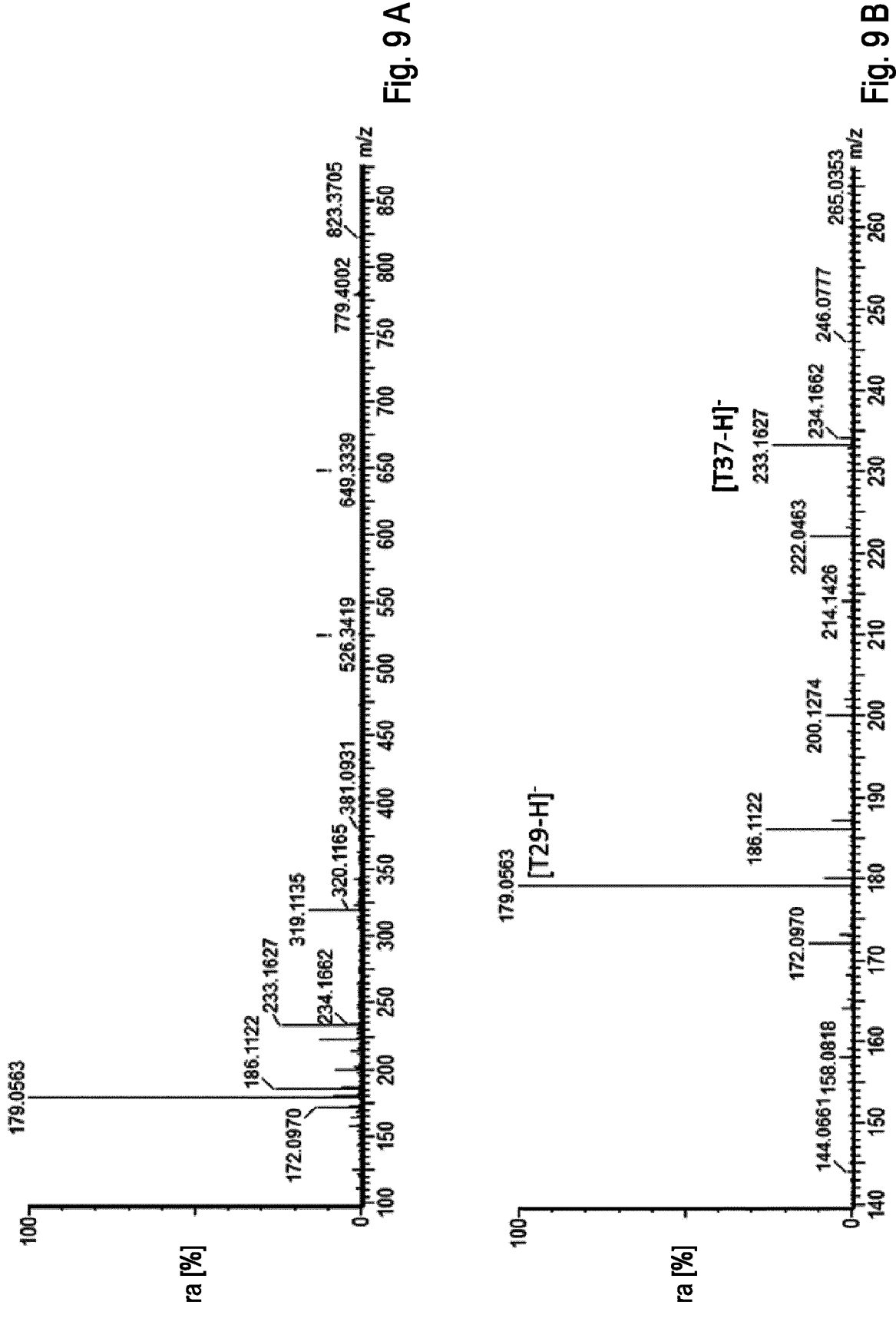
FIGS. 9A to 9D show a full scan mass spectrum of a therapeutic mix measured on the purified heteroatom-modified hydrogen-comprising carbon surface at a laser energy of 400 in the negative ion mode (FIG. 9A) with the respective enlargements in the mass ranges between m/z 140 to m/z 265 (FIG. 9B), m/z 315 to m/z 350 (FIG. 9C) and m/z 744 to m/z 805 (FIG. 9D)
Figure 9:
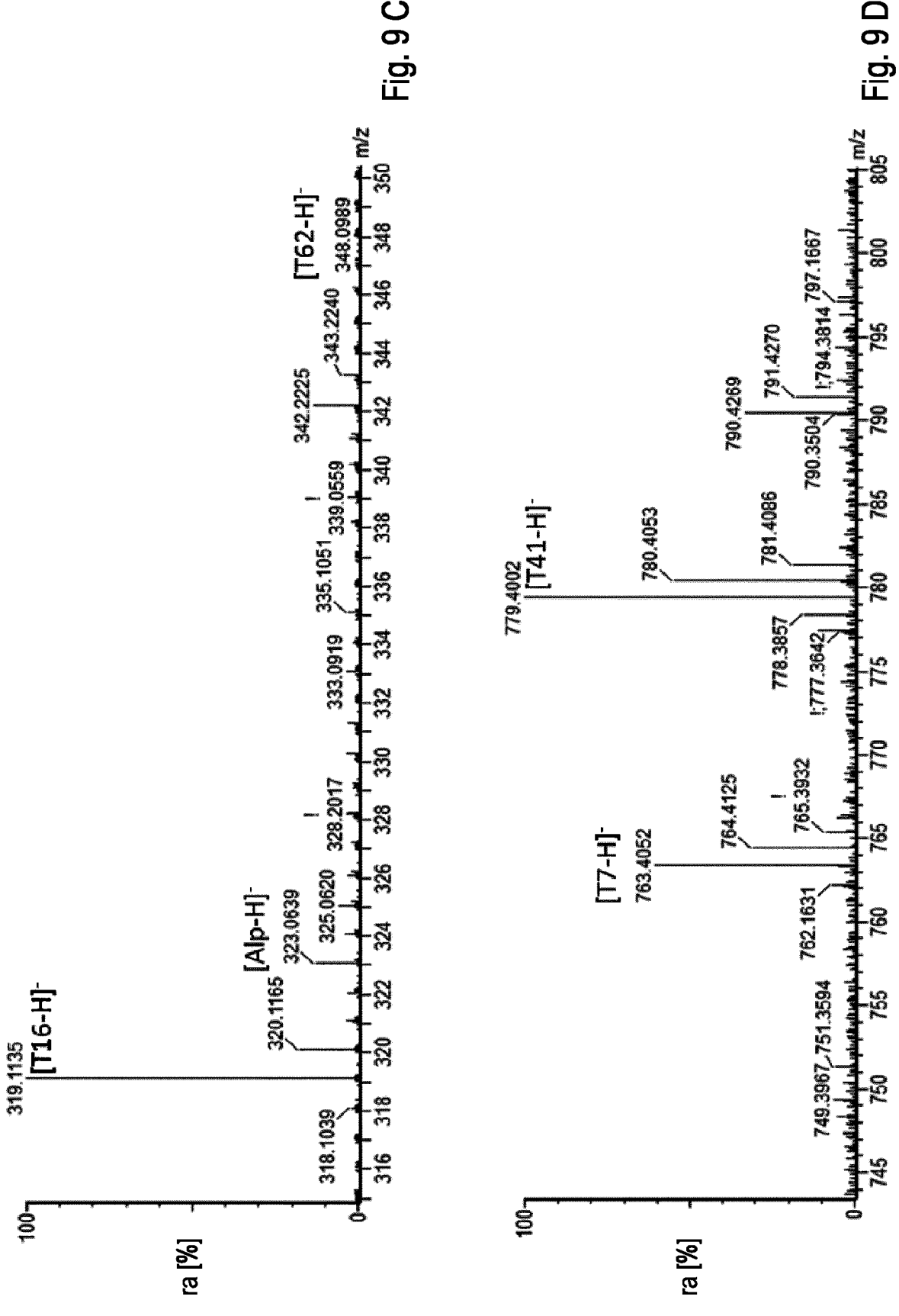

Also, this therapeutic analyte mix was examined for the laser desorption ionization on the heteroatom-modified hydrogen-comprising carbon surface utilizing the negative ionization mode. Therefore, 1 μL was previously dried on the purified heteroatom-modified hydrogen-comprising carbon surface and was irradiated with a laser energy of 400 units. The resulting full scan mass spectrum, as well as the corresponding enlargements, are given in FIGS. 9A to 9D. FIGS. 9A to 9D show a full scan mass spectrum of a therapeutic mix measured on the purified heteroatom-modified hydrogen-comprising carbon surface at a laser energy of 400 units in the negative ion mode (FIG. 9A) with the respective enlargements in the mass ranges between m/z 140 to m/z 265 (FIG. 9B), m/z 315 to m/z 350 (FIG. 9C) and m/z 744 to m/z 805 (FIG. 9D). Besides T62, which was detected in traces, all other analytes showed effective laser desorption ionization on the heteroatom-modified hydrogen-comprising carbon surface. Resulting ions were generally the deprotonated analyte species [M–H]$^-$. These results show that the heteroatom-modified hydrogen-comprising carbon surface is capable of the laser desorption ionization of diverse therapeutically relevant analytes in the small molecular weight range, both in the positive and negative ionization mode.

Figure 10:
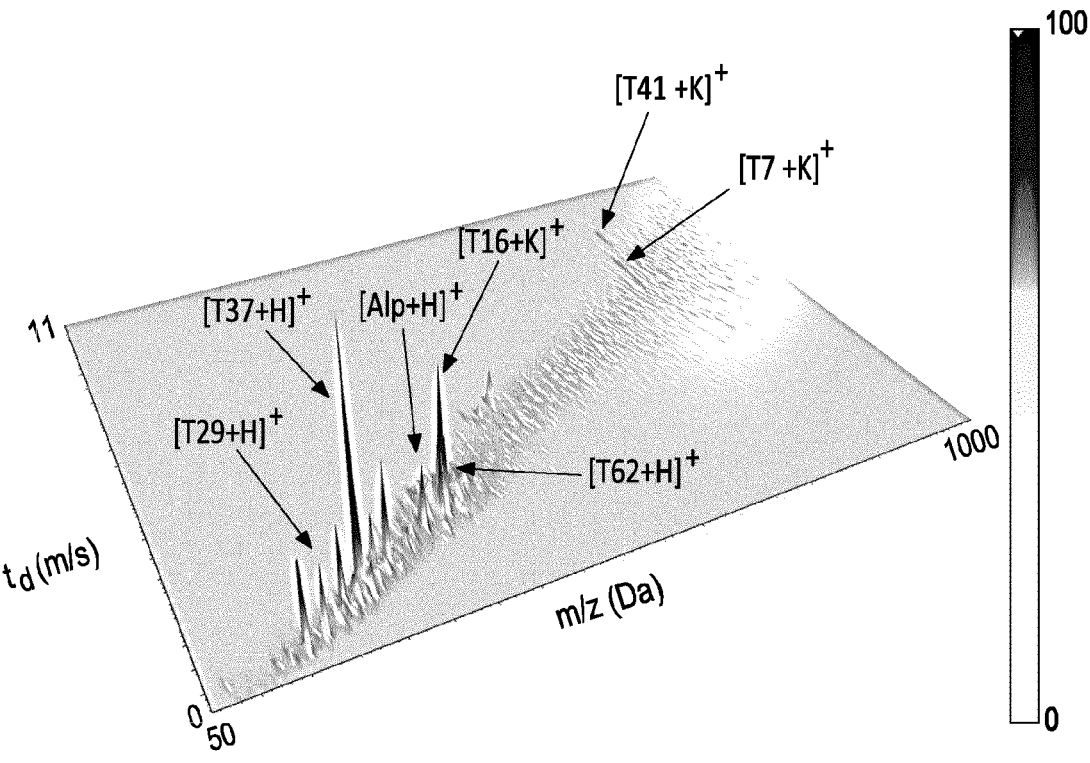
FIGS. 10A to 10B show a full scan mass spectrum of the therapeutic mix measured on the purified a-C:H:Si surface at a laser energy of 380 in the positive ion mode plotted against the drift time after IMS separation in a 3D illustration (FIG. 10A) and in a 2D illustration (FIG. 10B).
Figure 10:
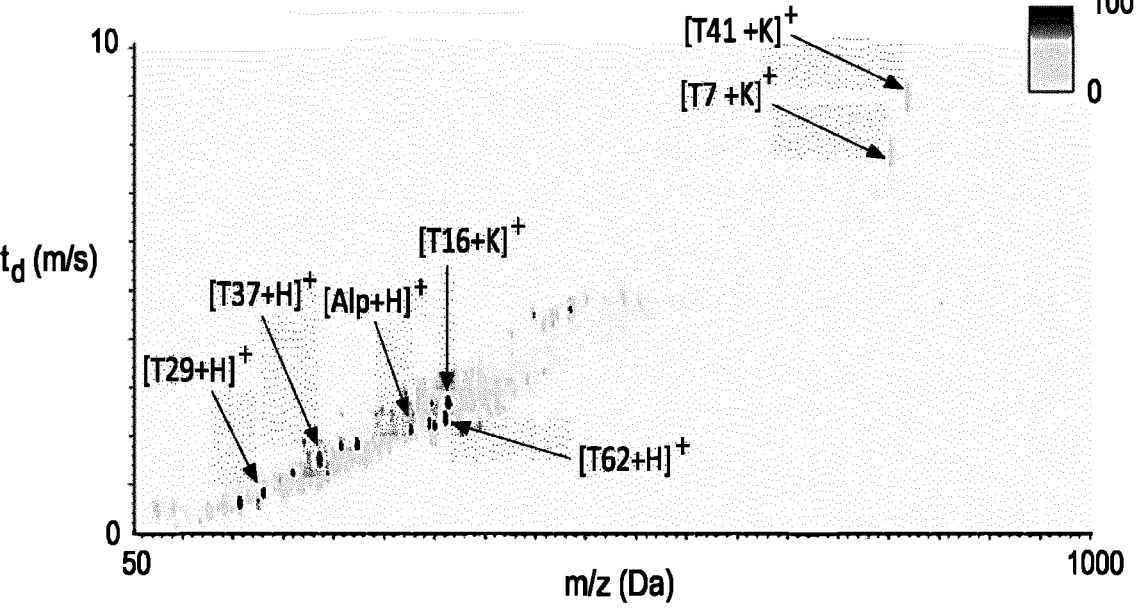

Another important application of the a-C:H:Si:X layer is the combination of the laser desorption and ionization with ion mobility spectrometry (IMS), allowing the ion generation using the herein described a-C:H:Si:X layer with the ion separation capability of IMS. This was also measured using the therapeutic mix in the positive ionization mode as before, but operating additionally in the IMS-measurement mode of the Synapt G2-Si mass spectrometer. As drift gas, nitrogen is used, at a wave velocity of 650 m/s and a wave height of is 40 V. FIGS. 10A and 10B respectively show a full scan mass spectrum of the therapeutic mix measured on the purified a-C:H:Si:X surface at a laser energy of 380 in the positive ion mode plotted against the drift time t$_d$ in ms after IMS separation in a 3D illustration (FIG. 10A) and in a 2D illustration (FIG. 10B). In the following Table 2, data from the ion mobility spectrum are provided in tabular form. As can be seen in FIGS. 10A and 10B, a separation of all seven analytes was successfully achieved and the plot of the m/z ratio against the drift time t$_d$ resulted in additional valuable data. This proves the broad applicability of the a-C:H:Si:X surface, even when a separation of the analyte mixture is needed.

TABLE 2

Data from the ion mobility spectrum in tabular form

| | m/z | t$_d$ [ms] |
|---|---|---|
| [T29 + H]$^+$ | 181.1 | 0.82 |
| [T37 + H]$^+$ | 235.2 | 1.53 |
| [Alp + H]$^+$ | 325.1 | 2.12 |
| [T62 + H]$^+$ | 350.1 | 2.21 |
| [T16 + K]$^+$ | 359.1 | 2.34 |
| [T7 + K]$^+$ | 803.4 | 7.79 |
| [T41 + K]$^+$ | 819.4 | 9.06 |

Figure 11:
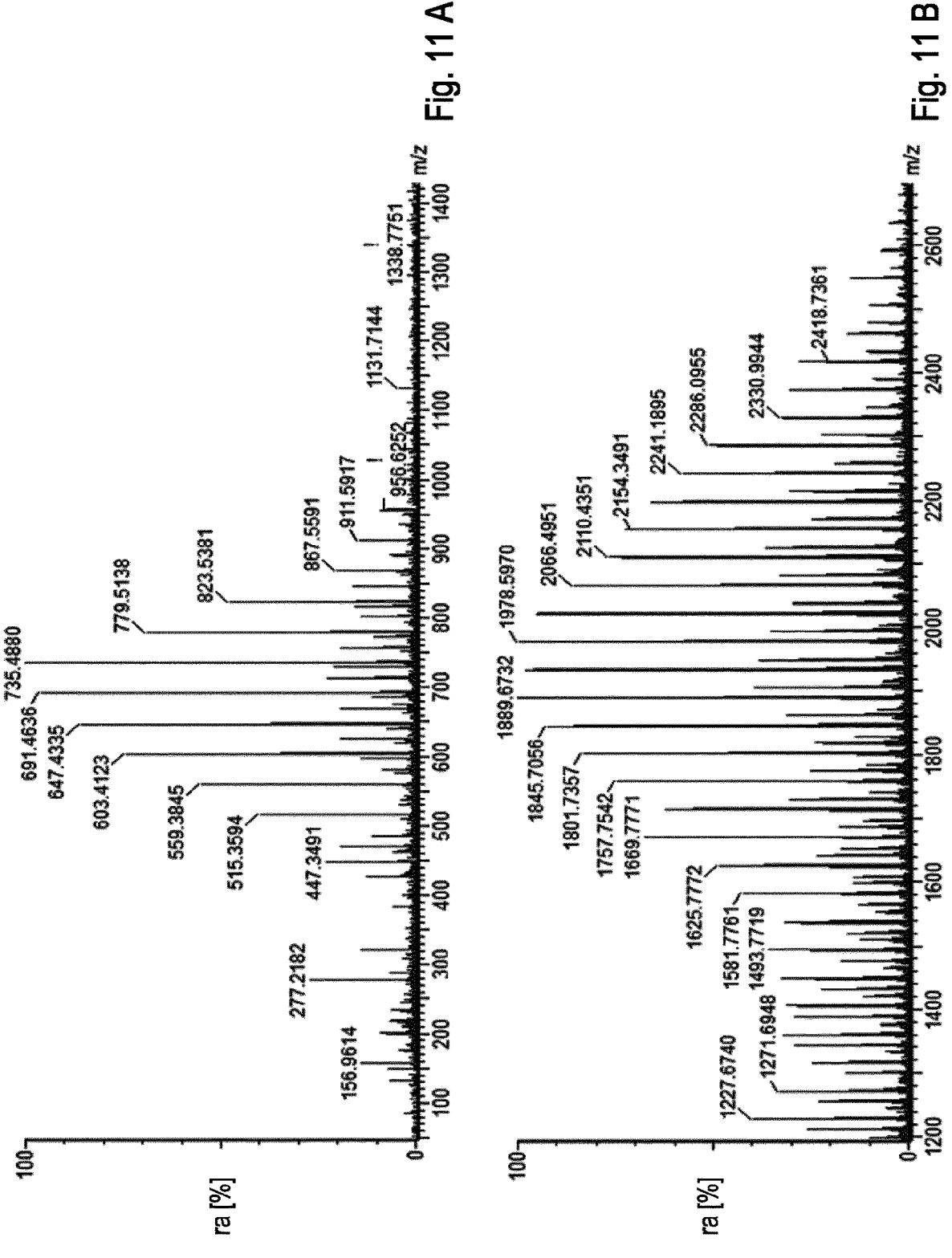
FIGS. 11A to 11B show enlargements in the mass ranges of full scan mass spectra of the analytes Triton X-100 (FIG. 11A) and PEG1970 (FIG. 11B), measured by laser desorption ionization on a purified heteroatom-modified hydrogen-comprising carbon surface at a laser energy of 450 in the positive ion mode.

Other experiments, illustrating the applicability of the heteroatom-modified hydrogen-comprising carbon surface also in the presence of analytes, which cover a broader mass range, were performed. Therefore, two substances were chosen, which comprised each polyethylene glycol (PEG) chains with different chain lengths and their corresponding size distributions. One first analyte solution covered the detergent Triton X-100 (10 μg/mL in $H_2O$/MeCN=80/20) and a second analyte solution covered PEG1970 (Mp=1970, PDI=1.03, 100 μg/mL in $H_2O$/MeCN=80/20). Each solution was spotted (1 μL) separately on the heteroatom-modified hydrogen-comprising carbon surface and dried. Subsequent SALDI measurements with a laser intensity of 450 units resulted in the mass spectra as displayed in FIGS. 11A and 11B. FIGS. 11A and 11B show enlargements in the mass ranges of full scan mass spectra of the analytes Triton X-100 (FIG. 11A) and PEG1970 (FIG. 11B), measured by laser desorption ionization on a purified heteroatom-modified hydrogen-comprising carbon surface at a laser energy of 450 units in the positive ion mode. Triton X-100 hereby showed the characteristic protonated adduct peaks in the mass range mainly between m/z 400 and m/z 1000. The PEG1970 sample presented mainly the sodiated adducts $[M+Na]^+$ with also its minor potassiated adduct species $[M+K]^+$. The size distribution of the PEG1970 sample was localized predominantly in the range between m/z 1300 to m/z 2600. This proved the suitability of the heteroatom-modified hydrogen-comprising carbon surface for SALDI analysis over a broad range of small to mid molecular weight analytes.

An important class of analytes in the low to mid molecular weight region generally are peptides. To test the suitability of the laser desorption ionization measurement on the heteroatom-modified hydrogen-comprising carbon surface, the therapeutically important cyclic peptide Cyclosporin A (CsA, 1 μL, 100 μg/mL in MeCN/$H_2O$=80/20) was selected.

Figure 12:
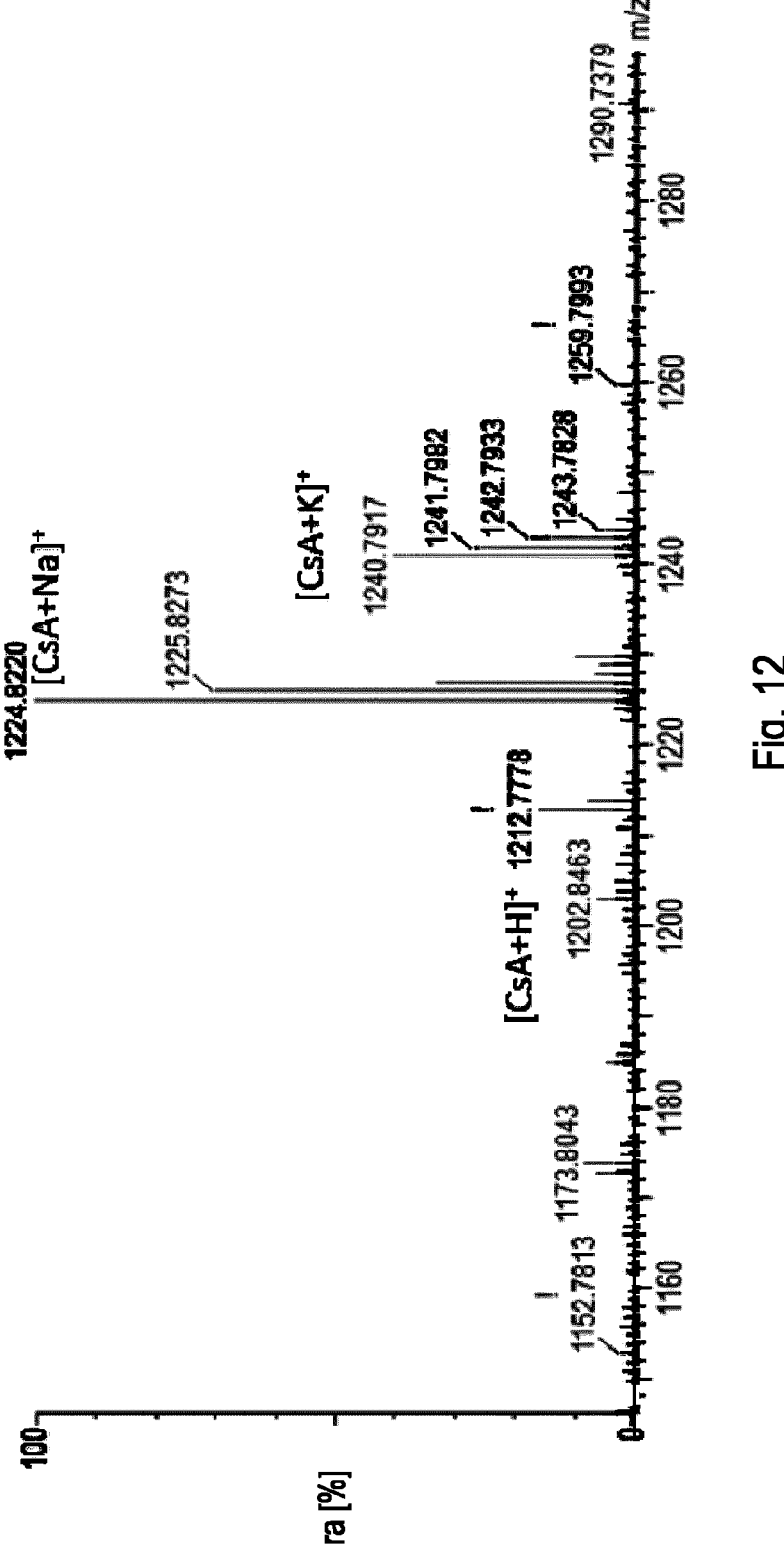
FIG. 12 shows an enlargement in the mass range between m/z 1150 to m/z 1300 of a full scan mass spectrum of Cyclosporin A, measured by laser desorption ionization on a purified heteroatom-modified hydrogen-comprising carbon surface at a laser energy of 450 in the positive ion mode.

The respective enlargement of the resulting mass spectrum is displayed in FIG. 12. FIG. 12 shows an enlargement in the mass range between (m/z 1150 to m/z 1300) of a full scan mass spectrum of Cyclosporin A, measured by laser desorption ionization on a purified heteroatom-modified hydrogen-comprising carbon surface at a laser energy of 450 in the positive ion mode. Cyclosporin A resulted mainly in the detection of the sodiated adduct $[CsA+Na]^+$, with also some potassiated adduct $[M+K]^+$ and even few protonated analyte adducts $[M+H]^+$. With CsA, an analytically important peptide was successfully detected by SALDI-MS on the heteroatom-modified hydrogen-comprising carbon surface.

Beside the successful laser desorption ionization of analytes from the heteroatom-modified hydrogen-comprising carbon surface, a further experiment was performed to demonstrate the capability of the desorption of permanently positive charged molecules which do not require further ionization. For this, a solution of testosterone, which was derivatized with Girard T reagent, was prepared (TeGT, 10 μg/mL in $H_2O$/MeCN=80/20) and 1 μL was spotted on the heteroatom-modified hydrogen-comprising carbon surface and was dried.

Figure 13:
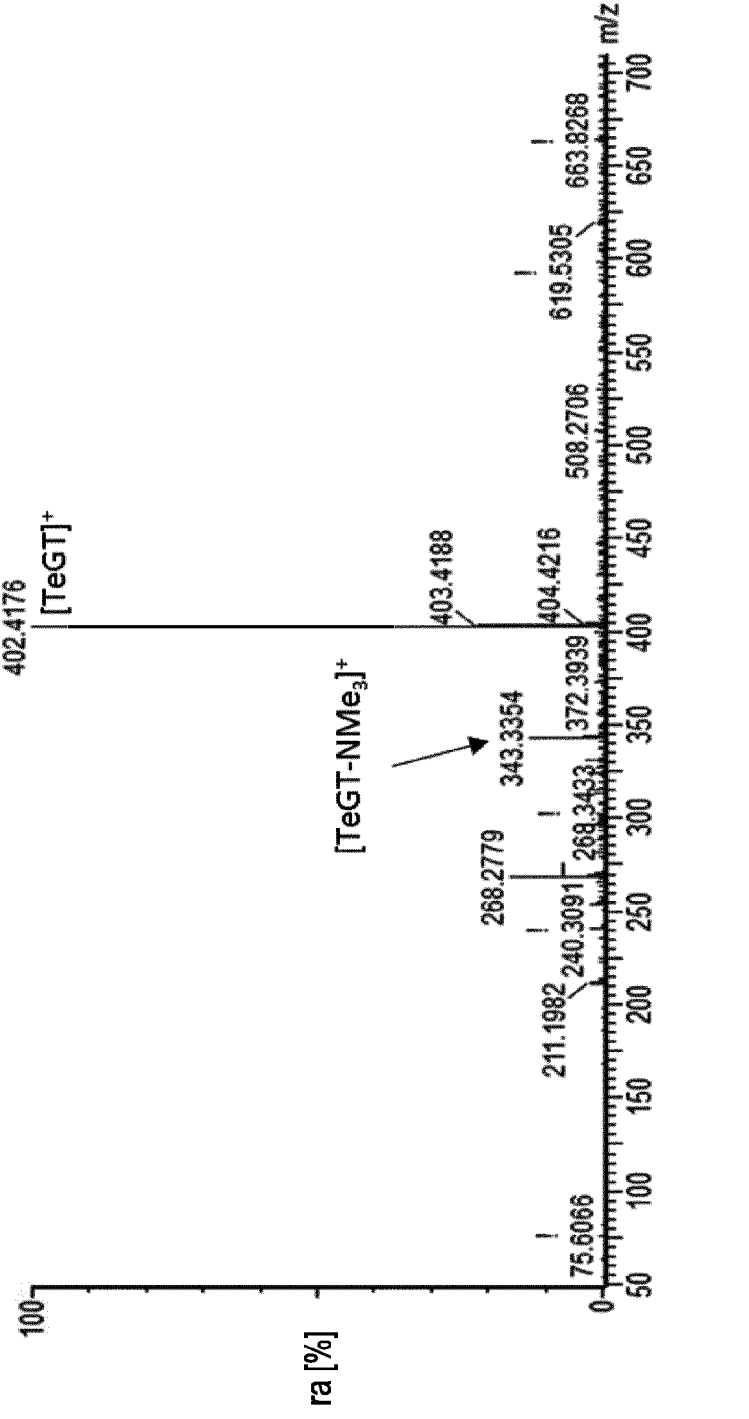
FIG. 13 shows a full scan mass spectrum of the permanently positive charged analyte Testosterone-Girard T, measured on a purified heteroatom-modified hydrogen-comprising carbon surface at a laser energy of 380 in the positive ion mode.

Measuring this cationic analyte with a laser irradiation (intensity 380 units) resulted in the full scan mass spectrum, as is shown in FIG. 13. In FIG. 13, a full scan mass spectrum of the permanently positive charged analyte Testosterone-Girard T, measured on a purified heteroatom-modified hydrogen-comprising carbon surface at a laser energy of 380 units in the positive ion mode is shown. The major signal could be assigned to the analyte $[TeGT]^+$ itself, with only minor fragments, such as $[TeGT-NMe_3]^+$. This provided the confirmation, that the laser energy transfer by the heteroatom-modified hydrogen-comprising carbon surface is relatively soft, without extensive fragmentation of the analyte during desorption.

Also, this experiment showed the compatibility regarding a derivatization of analytes, which is often used for example in the analysis of steroids.

Figure 14:
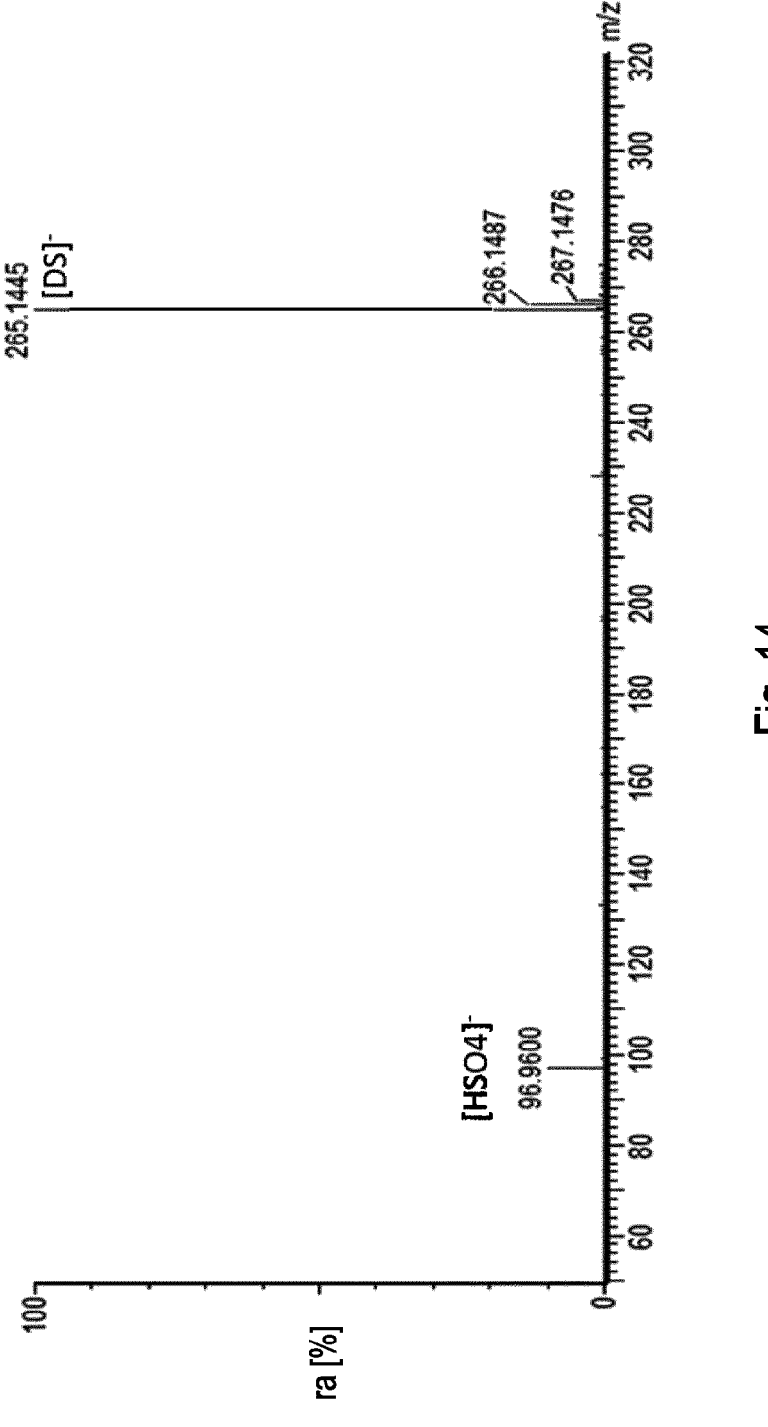
FIG. 14 shows a product ion scan of the permanently negative charged analyte dodecyl sulfate (DS), measured on a purified heteroatom-modified hydrogen-comprising carbon surface at a laser energy of 400 in the negative ion mode.

Moreover, a permanent negative analyte was tested. The solution of sodium dodecyl sulfate (SDS, 100 μg/mL in $H_2O$), was applied on the heteroatom-modified hydrogen-comprising carbon surface (1 μL) and dried. Subsequently, a SALDI measurement was performed by irradiation with an intensity of 400 units. The product ion scan of m/z 265.1 (CE=20 eV) was recorded to show the corresponding fragmentation of dodecyl sulfate, as shown in FIG. 14. FIG. 14 shows a product ion scan of the permanently negative charged analyte dodecyl sulfate (DS), measured on a purified heteroatom-modified hydrogen-comprising carbon surface at a laser energy of 400 units in the negative ion mode. The dodecyl sulfate anion $[DS]^-$ was observed in quite high intensity. As main fragment, $[HSO_4]^-$ occurred, indicating the elimination of the sulfate end group of dodecyl sulfate. The desorption of a negatively charged analyte on the heteroatom-modified hydrogen-comprising carbon surface was therefore successfully shown.

Figure 15:
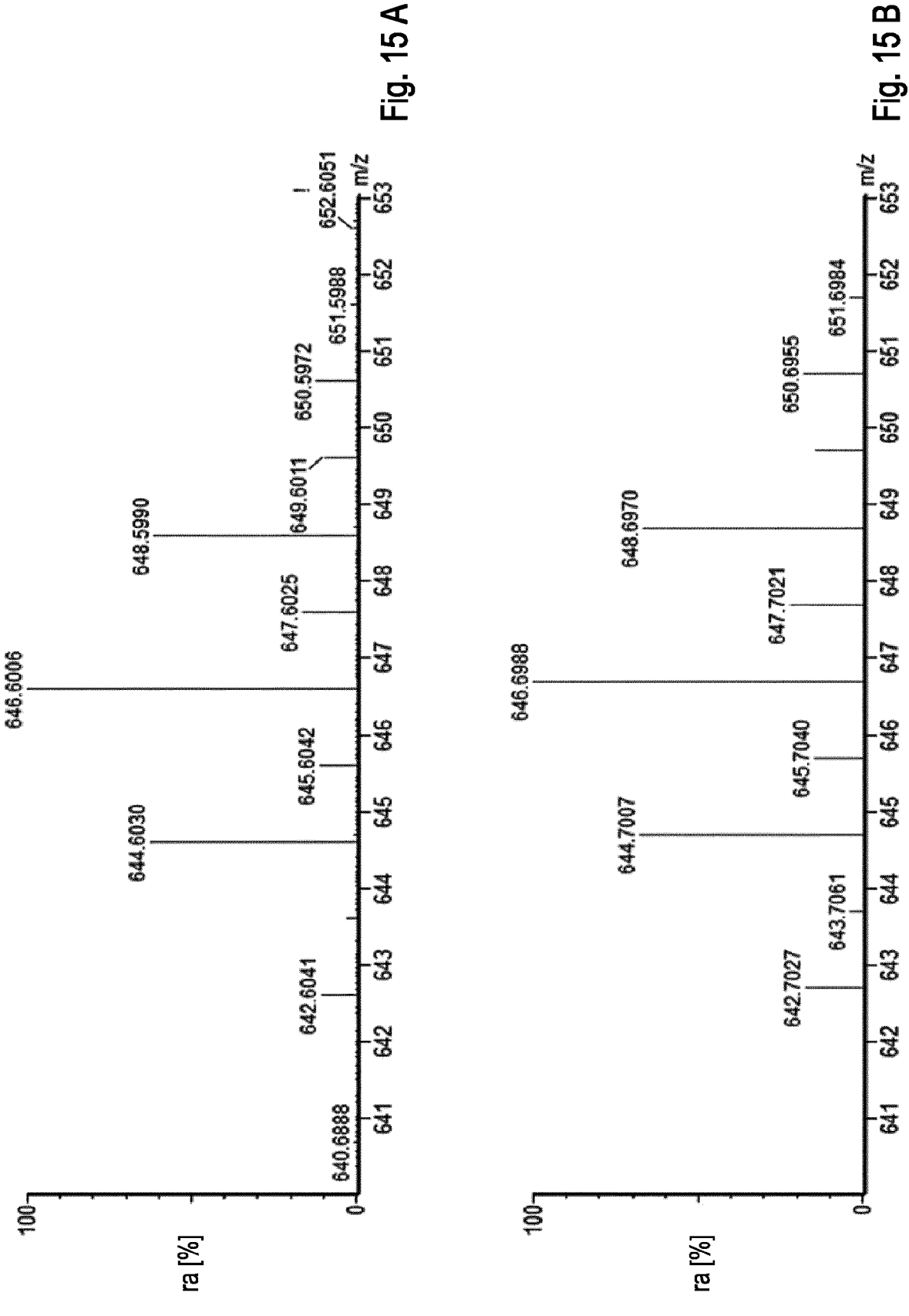
FIGS. 15A to 15B show a corresponding enlargement of the isotope pattern of [EY–H]⁻ in the range between m/z 640 to m/z 653 (FIG. 15A) and the calculated isotope pattern of [EY–H]⁻ (FIG. 15B)

A further observation regarding the SALDI performance of the heteroatom-modified hydrogen-comprising carbon surface aimed to display the desorption and ionization of analytes with an accurate isotope pattern. As model substrate, the histological important stain Eosin Y (EY) was selected, due to the presence of four bromine atoms inside the structure. 1 μL of the analyte solution (EY, 1 mg/mL in MeOH/$H_2O$=80/20) was spotted on the heteroatom-modified hydrogen-comprising carbon surface, dried, and subsequently measured by SALDI mass spectrometry (laser intensity 360 units) in the negative ion mode. The observed full scan showed a main formation of the deprotonated molecule $[EY-H]^-$. An enlargement of the range between m/z 640 to m/z 653, as shown in FIGS. 15A and 15B confirmed the predicted shape of the isotope pattern of the species $[C_{20}H_7Br_4O_5]^-$. FIGS. 15A and 15B show a corresponding enlargement of the isotope pattern of $[EY-H]^-$ in the range between m/z 640 to m/z 653 (FIG. 15A) and the calculated ion pattern of $[EY-H]^-$ (FIG. 15B). This experiment underlines the broad applicability of the herein described heteroatom-modified hydrogen-comprising carbon surface, because it is an important consideration for quantitative analysis, where isotope-labeled internal standards are commonly used.

Example 3

As a third example a quantification of analytes regarding SALDI-MS on a heteroatom-modified hydrogen-comprising carbon surface was evaluated.

While the qualitative performance and usability of the heteroatom-modified hydrogen-comprising carbon surface regarding SALDI-MS is shown above in detail, a quantitative capability would additionally be highly valuable. For this analysis, two serial dilutions were performed with targets having heteroatom-modified hydrogen-comprising carbon surfaces, in the positive and negative ion mode respectively, and the results were compared to a blank steel plate and a weathered steel plate.

Figure 16:
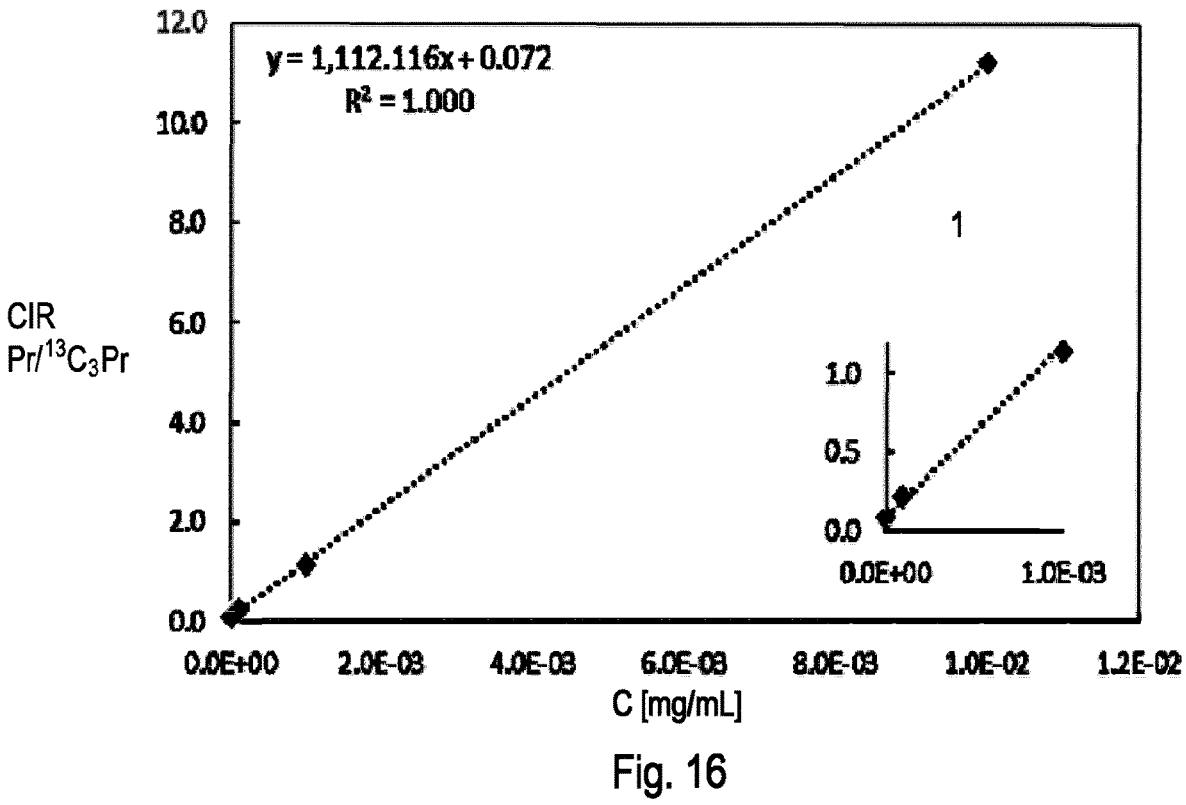
FIG. 16 shows a plot of a combined intensity ratio Pr/$^{13}$C₃Pr CIR Pr/$^{13}$C₃Pr against a concentration c of Pr in the range between 10 µg/ml to 10 ng/mL, with the linear regression line and, additionally, an enlargement of the range between 1.0 µg/mL to 10 ng/mL.

At first, a serial dilution of progesterone comprising $^{13}C_3Pr$ as internal standard was selected. The concentration of Pr in detail was 10 μg/mL, 1.0 μg/mL, 100 ng/mL and 10 ng/mL, while $^{13}C_3Pr$ was added to all samples in a concentration of 1.6 μg/mL. Each analyte solution was spotted separately with 1 μL sample volume on a purified heteroatom-modified hydrogen-comprising carbon surface and dried. The following SALDI-MS measurements, irradiating each spot with a laser intensity of 450 units, result in the detection of [M+H]$^+$ and [M+Na]$^+$ adducts for Pr as well as $^{13}C_3$—Pr. The combined intensities [Pr+H]$^+$ and [$^{13}C_3$Pr+ H]$^+$ of each analyte spot were evaluated and the combined intensity ratios Pr/$^{13}C_3$Pr, CIR Pr/$^{13}C_3$Pr, were calculated and plotted against the corresponding concentration c, as can be seen in FIG. 16. FIG. 16 shows a plot of a combined intensity ratio Pr/$^{13}C_3$Pr CIR Pr/$^{13}C_3$Pr against a concentration c of Pr in the range between 10 µg/ml to 10 ng/mL, with the linear regression line and, additionally, an enlargement of the range between 1.0 µg/mL to 10 ng/mL. Over the whole range, a linear dependence was observed. Even at 10 ng/mL, progesterone was detected successfully, and considering the low sample volume, this resembled a total of 32 fmol on a single spot. The heteroatom-modified hydrogen-comprising carbon surface is therefore applicable for the quantification of progesterone with an internal standard by SALDI mass spectrometry in the positive ion mode.

Figure 17:
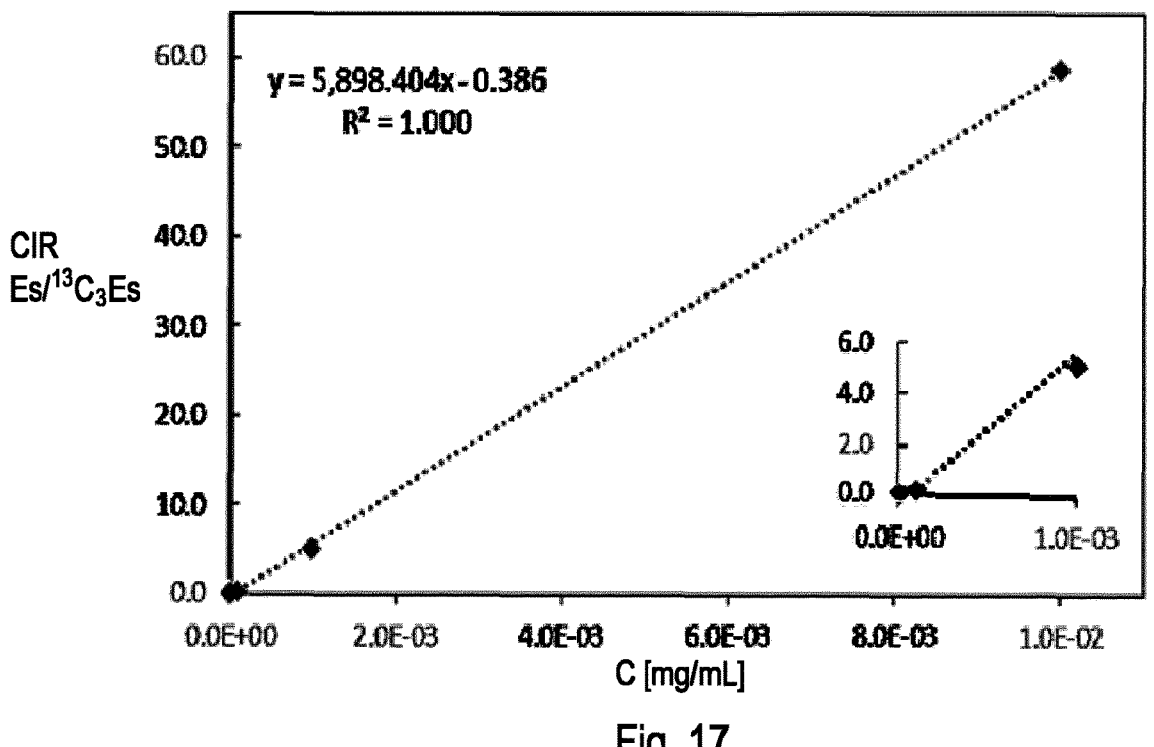
FIG. 17 shows a plot of a combined intensity ratio Es/$^{13}$C₃Es CIR Es/$^{13}$C₃Es against a concentration c of Es in the range between 10 µg/ml to 10 ng/mL, with the linear regression line and, additionally, an enlargement of the range between 1.0 µg/mL to 10 ng/mL.

The quantitative analysis using the heteroatom-modified hydrogen-comprising carbon surface was furthermore tested in the negative ion mode with a serial dilution of estradiol. The concentration of Es in detail was 10 µg/mL, 1.0 µg/mL, 100 ng/mL and 10 ng/mL, while $^{13}C_3$Es was added as internal standard to all samples in a concentration of 1.6 µg/mL. Each analyte solution was spotted separately with 1 µL sample volume on a purified heteroatom-modified hydrogen-comprising carbon surface and was dried. The following SALDI-MS measurements, irradiating each spot with a laser intensity of 380 units in the negative ion mode, resulted in the detection of [M–H]$^-$ for Es as well as $^{13}C_3$Es. The combined intensities [Es–H]$^-$ and [$^{13}C_3$Es–H]$^-$ of each analyte spot were evaluated and the combined intensity ratios Es/$^{13}C_3$Es CIR Es/$^{13}C_3$Es were calculated and plotted against the corresponding concentration, as can be seen in FIG. 17. FIG. 17 shows a plot of a combined intensity ratio Es/$^{13}C_3$Es CIR Es/$^{13}C_3$Es against a concentration c of Es in the range between 10 µg/ml to 10 ng/mL, with the linear regression line and, additionally, an enlargement of the range between 1.0 µg/mL to 10 ng/mL. Up to the concentration of 100 ng/mL, a linear dependence was observed. Considering the low sample volume, this resembled a total of 369 fmol on a single spot. The heteroatom-modified hydrogen-comprising carbon surface is therefore applicable for the quantification of estradiol with an internal standard by SALDI mass spectrometry in the negative ion mode.

Figure 18:
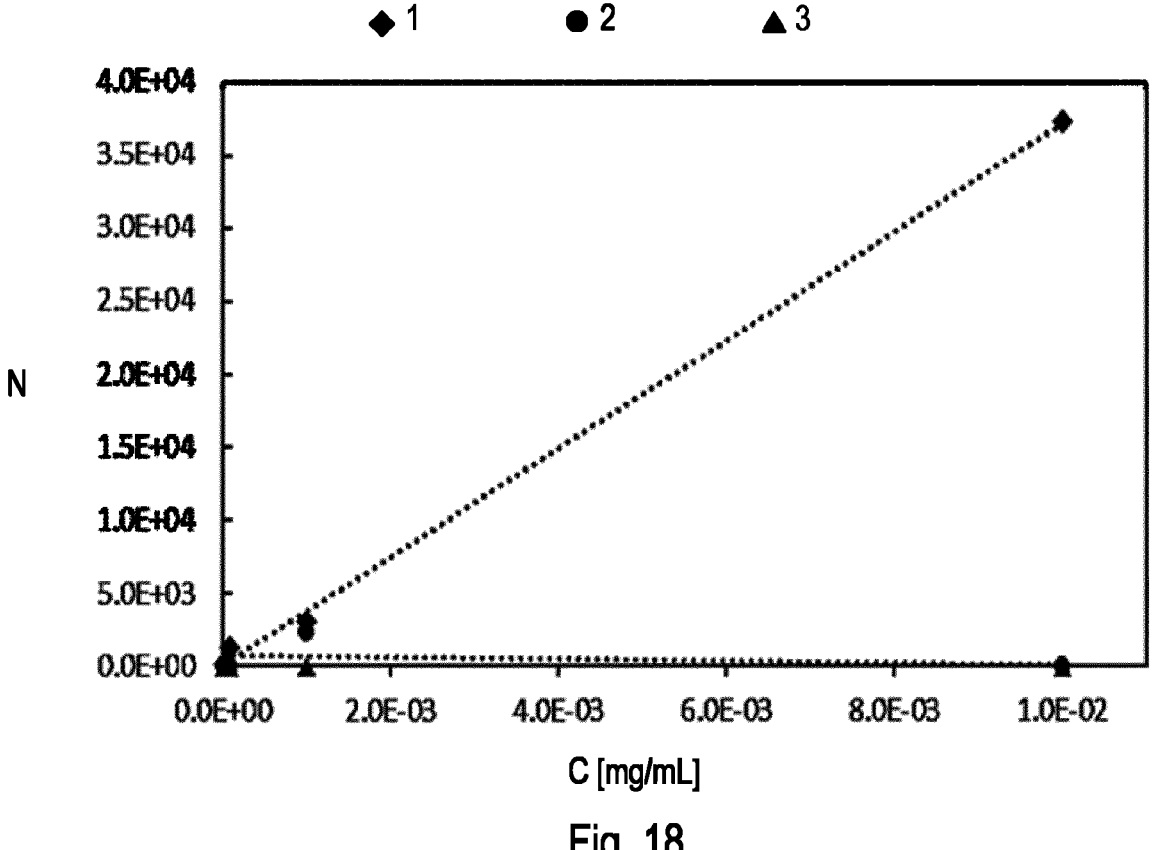
FIG. 18 shows a plot of a combined number of counts of [Es–H]⁻ against a concentration of Es in the range between 10 mg/ml to 10 ng/mL on the heteroatom-modified hydrogen-comprising carbon surface in comparison to a bare steel plate and a rusted steel plate.

To verify that the desorption and ionization of analytes is affected by the heteroatom-modified hydrogen-comprising carbon surface, the serial dilution of estradiol was measured again on a bare steel plate and also on a rusted steel plate. The latter one was additionally chosen, because similar weathering effects of stainless steel were mentioned in Reichardt et al., Analyst 2014, 139, 2873, DOI 10.1039/ c4an00216d to appear in some SALDI performance. The weathering of a steel plate was performed in an aqueous NaCl bath over one day and cleaned sufficiently with deionized water, tetrahydrofuran and acetonitrile. On both, the bare purified steel plate and the rusted steel plate, the dilution series of estradiol—as prepared before—were spotted with 1 µL sample volume and dried. The following SALDI-MS measurements, irradiating each spot with a laser intensity of 380 units in the negative ion mode, resulted in mostly no detection of [M–H]$^-$ of Es as well as $^{13}C_3$Es. The combined number of counts [Es–H]$^-$ of each analyte spot were evaluated and plotted against the corresponding concentration in comparison to the results with the het-eroatom-modified hydrogen-comprising carbon surface, as can be seen in FIG. 18. FIG. 18 shows a plot of a combined number of counts N of [Es–H]$^-$ against a concentration c of Es in the range between 10 µg/ml to 10 ng/mL on the heteroatom-modified hydrogen-comprising carbon surface (1, rectangles) in comparison to a bare steel plate (2, circles) and a rusted steel plate (3, triangles). Only the bare steel plate resulted on a single spot (1.0 µg/mL) in some detection of estradiol, but this seemed to be more an outlier, due to no further detection of analytes at all other concentrations. Also the rusted steel plate led to no detection of analytes—not even at the highest concentration at 10 µg/mL estradiol. On the contrary, the heteroatom-modified hydrogen-comprising carbon surface resulted in a significant desorption and ionization of the estradiol serial dilution samples. These experiments proved that the desorption and ionization of analytes are initiated by the heteroatom-modified hydrogen-comprising carbon surface itself during laser irradiation, whereas a simple steel plate as well as a rusted steel plate do not have the ability to desorb and ionize analytes effectively, especially in a quantitative manner.

Example 4

As a fourth example a reusability of the heteroatom-modified hydrogen-comprising carbon surface was evaluated.

Another beneficial feature of a SALDI surface coating would be its reusability without reducing significantly the functional efficiency. Because there are no visible signs of a deterioration of the heteroatom-modified hydrogen-comprising carbon surface after a measurement with a laser irradiation of up to 450 units, an additional experiment was implemented to estimate whether a reusability of the het-eroatom-modified hydrogen-comprising is carbon surface is possible. For this, a new target having a heteroatom-modified hydrogen-comprising carbon surface was cleaned, spotted in duplicate with an analyte solution, consisting of Pr and $^{13}C_3$Pr, both in a concentration of 1.0 µg/mL, dried and measured by SALDI-MS with a laser intensity of 450 units. Cleaning again the target having the het-eroatom-modified hydrogen-comprising carbon surface, this procedure was iterated for additional four times. The normalized combined intensity ratio Pr/$^{13}C_3$Pr NCIR Pr/$^{13}C_3$Pr was calculated for both, [M+H]$^+$ and [M+Na]$^+$, and plotted against a number of times Art the position was used. An example of the relevant part of the first full scan mass spectrum is given in FIG. 19A, as well as the plot of the combined intensity ratio in FIG. 19B. FIG. 19A shows a respective part (m/z 330 to m/z 348) of a full scan mass spectrum of [Pr+Na]$^+$ and [$^{13}C_3$Pr+Na]$^+$ resulting from a first SALDI-MS measurement on a het-eroatom-modified hydrogen-comprising carbon surface with a laser intensity of 450 units and FIG. 19B shows a normalized combined intensity ratio Pr/$^{13}C_3$Pr NCIR Pr/$^{13}C_3$Pr of [M+H]$^+$ (1, triangles) and [M+Na]$^+$ with N=2 (2, circles) plotted against the number of times Art the position was used. It can be concluded that there is no significant loss of the laser desorption ionization performance of a heteroatom-modified hydrogen-comprising carbon surface even after 5 uses of the same spot and at increased laser intensity.

Example 5

As a fifth example a performance in the presence of realistic matrices was evaluated.

Relating to the broad analyte scope, quantification and reusability opportunities of the het-eroatom-modified hydrogen-comprising carbon surface at SALDI mass spectrometry, a last consideration was taken to elucidate the perfor-
mance in the presence of realistic matrices, such as tissue,
serum, whole cell samples. A successful application of the
heteroatom-modified hydrogen-comprising carbon surface
in the analysis of diverse biological or diagnostic samples,
would resemble a huge leap in the state of the art of SALDI
mass spectrometry.

The first experiment aimed to demonstrate a desorption
and ionization of a selected analyte in the presence of a
processed formalin fixed paraffin embedded (FFPE) tonsillar
tissue sample. The paraffin of the FFPE tissue sample was
softened with cautious heating to 36° C. and washed away
with small amounts of tetrahydrofuran. The tonsillar tissue
sample was macerated with some drops of deionized water
and transferred to the heteroatom-modified hydrogen-com-
prising carbon surface of the target. On a defined spot of the
tissue sample, 1 μL of a 10 μg/mL estradiol sample solution
was added on top of the tonsillar tissue sample. The follow-
ing SALDI measurement in the negative ion mode was
performed with a laser intensity of 380 units—with one
mass spectrum recording the background of the processed
FFPE tonsillar sample and another mass spectrum recording
the spot, where estradiol was spiked on top. Both mass
spectra can be compared in FIGS. 20A and 20B. FIGS. 20A
and 20B show full scan SALDI mass spectra of a processed
FFPE tonsillar tissue sample on a heteroatom-modified
hydrogen-comprising carbon surface with the background of
the tissue (FIG. 20A) and the tissue spiked with estradiol
(FIG. 20B) operating in the negative ion mode with a laser
intensity of 380 units. A background of the tissue sample
itself and residual paraffin was clearly visible in the corre-
sponding mass spectrum. Despite the background signals,
the sample spot with previous addition of estradiol resulted
clearly in the detection of [Es−H]⁻. This is a quite important
result, because it clarifies that the SALDI performance of the
heteroatom-modified hydrogen-comprising carbon surface
is not just limited to sample solutions alone, but is also
useful in the analysis of tissue samples with a challenging
matrix.

The successful SALDI analysis on the heteroatom-modi-
fied hydrogen-comprising carbon surface in the presence of
complex matrices also led to the thought of using this
surface coating for SALDI imaging mass spectrometry. With
a tissue sample that is thin enough to let the laser pulse pass
to the a-C:H:Si:X layer, a direct energy transfer from the
coating to the tissue could be possible. This spared an
extensive sample preparation with matrix application and
could lead to a high spatial resolution. For this experimental
observation, a thin slice of a garlic clove (*Allium sativum*,
obtained from a local grocery store) was used as model
substrate. The cross section comprised a sprout that was
surrounded by a storage leaf and was simply pressed against
the a-C:H:Si:X layer. The SALDI imaging was performed in
the positive ion mode with a laser energy of 380 units, a laser
repetition rate of 2.5 kHz and a spatial resolution of 50
μm×50 μm. Resulting mass spectra showed several detected
low to mid molecular weight compounds. Some substances
could be assigned.

Especially glycans in different chain lengths were recog-
nized, mostly as potassiated ions [M+K]⁺, but also some
potential natural products could be seen. In FIG. 21A, an
image of the spatial distribution of sucrose [M+K]⁺ is
shown, whereas in FIG. 21B, the spatial distribution of m/z
527.1 is illustrated. An intensity of the detected signals
corresponds to a relative scale with increasing gray level.
Thus, the white or light background corresponds to no to low
relative distribution of the corresponding compound and a black or dark pixel color corresponds to a high relative
detected distribution of the corresponding compound. Spe-
cifically, FIG. 21A shows a spatial distribution of m/z 381.1
assigned to sucrose [M+K]⁺ as result from a SALDI imaging
experiment of a garlic clove cross section on a heteroatom-
modified hydrogen-comprising carbon surface and FIG. 21B
shows a spatial distribution of m/z 527.1 probably assigned
to dracorubin [M+K]⁺ as result from a SALDI imaging
experiment of a garlic clove cross section on a heteroatom-
modified hydrogen-comprising carbon surface. This experi-
ment illustrates the potential of the heteroatom-modified
hydrogen-comprising carbon surface even in the use as
target for SALDI imaging mass spectrometry of biological
or analytical samples.

LIST OF REFERENCE NUMBERS 110 target
112 surface
114 layer
116 heteroatom-modified hydrogen-comprising carbon
layer
118 substrate
120 laser desorption mass spectrometer
122 laser
124 mass analyzing unit
126 chamber
128 vacuum pump
130 arrow
132 pulsed laser
134 arrow
136 mass separation module
138 read-out electronics
140 continuous desorption mass spectrometer system
142 material strip
144 role
146 surface
148 station
150 liquid handling system
152 vacuum system
154 pipetting unit
156 region
158 vacuum zone
160 first vacuum zone
162 second vacuum zone
164 stack
166 platelet
168 sample
170 platelet holder
172 surface
174 layer
176 electrically conductive contact layer
178 surface
180 intermediate layer
182 outermost layer

The invention claimed is:

1. A target for use in a laser desorption mass spectrometer,
wherein the target has at least one surface, wherein the
surface is covered at least partially with at least one layer,
wherein the layer is a hydrogen comprising, silicon-incor-
porated amorphous carbon (a-C:H:Si) layer, wherein the
a-C:H:Si layer comprises:
40 at. % to 80 at. % of carbon;
1 at. % to 20 at. % of hydrogen; and
10 at. % to 40 at. % of silicon.

2. The target according to claim 1, wherein the a-C:H:Si
layer is a hydrogen comprising, heteroatom modified, silicon-incorporated amorphous carbon (a-C:H:Si:X) layer, wherein the heteroatom X is selected from the group consisting of oxygen, nitrogen, fluorine, boron, wherein the a-C:H:Si:X layer further comprises:

up to 15 at. % of oxygen;

up to 10 at. % of nitrogen;

up to 10 at. % of boron; and up to 5 at. % of fluorine;

wherein a sum of oxygen, nitrogen, fluorine and boron is at least 1 at. %.

3. The target according to claim 1, wherein the a-C:H:Si layer is deposited on the surface of the target by a plasma supported surface coating process.

4. The target according to claim 1, wherein the target comprises at least one substrate, wherein the substrate is made of at least one material which is selected from the group consisting of: glass; steel; aluminum; silicon; germanium; titanium; copper; cobalt; chromium; molybdenum; nickel; tungsten; tantalum; graphite; and a polymeric material.

5. The target according to claim 4, wherein the steel is stainless steel.

6. The target according to claim 4, wherein the polymeric material is selected from polyethylene, polypropylene, polycarbonate, polystyrene, polyacrylate, polyaniline, poly(3,4-ethylenedioxythiophene) polystyrene sulfonate, polypyrrole, and/or polythiophene.

7. A laser desorption mass spectrometer comprising:

a) at least one target according to claim 1;

b) at least one laser, wherein the laser is configured for providing energy to the target such that at least one ion of at least one analyte is generated; and c) at least one of a mass analyzing unit, an ion-mobility spectrometry device.

8. A continuous laser desorption mass spectrometer system comprising at least one laser desorption mass spectrometer according to claim 7, wherein the target is provided as a material strip or as a stack of platelets.

9. The continuous laser desorption mass spectrometer system according to claim 8, wherein the continuous laser desorption mass spectrometer system further comprises at least one vacuum system, wherein the continuous laser desorption mass spectrometer system is configured for passing the material strip or the platelets through the vacuum system.

10. A kit comprising (i) at least one target according to claim 1; and (ii) at least one internal standard.

11. A method for preparing at least one sample for analysis in a laser desorption mass spectrometer, wherein the method comprises:

i. providing at least one target according to claim 1; and ii. applying at least one sample to the target, wherein the sample comprises at least one analyte.

12. A method for detecting at least one analyte in a sample with a laser desorption mass spectrometer, wherein the method comprises:

I. conducting a method for preparing at least one sample for analysis in a laser desorption mass spectrometer according to claim 11; and II. detecting the at least one analyte in the sample with at least one laser desorption mass spectrometer.

13. The method according to claim 12, wherein the analyte is selected from a steroid, a therapeutically active substance, a detergent, a glycoside, a peptide, a protein, a dye, an ion, a nucleic acid, an amino acid, a metabolite, a hormone, a fatty acid, a lipid, and/or a carbohydrate.

14. The method according to claim 13, wherein the steroid is a ketosteroid or a secosteroid.

15. The method according to claim 12, wherein the analyte has a molar mass from 6 Da to 10000 Da.

16. The method according to claim 15, wherein the analyte has a molar mass from 6 Da to 3000 Da.

17. The method according to claim 12, wherein the sample is selected from a physiological fluid.

18. The method according to claim 17, wherein the physiological fluid is selected from blood, serum, plasma, saliva, ocular lens fluid, cerebral spinal fluid, sweat, urine, milk, ascites fluid, mucous, synovial fluid, peritoneal fluid, amniotic fluid, tissue and/or cells.

19. The method according to claim 12, wherein the analyte comprises permanently positive charged molecules or permanently negative charged molecules.

\* \* \* \* \*